US012664357B1

(12) United States Patent
Janenaite et al.

(10) Patent No.: US 12,664,357 B1
(45) Date of Patent: Jun. 23, 2026

(54) INCORPORATING ARTIFICIAL INTELLIGENCE ACTIONS IN WORKFLOWS IMPLEMENTED IN A CONTENT MANAGEMENT SYSTEM

(71) Applicant: Contentful GmbH, Berlin (DE)

(72) Inventors: Domile Janenaite, Berlin (DE); Paolo Negri, Berlin (DE); Christian Bieneck, Berlin (DE); Fabian Schultz, London (GB)

(73) Assignee: Contentful GmbH, Berlin (DE)

( * ) Notice: Subject to any disclaimer, the term of this patent is extended or adjusted under 35 U.S.C. 154(b) by 0 days.

(21) Appl. No.: 19/173,749

(22) Filed: Apr. 8, 2025

Related U.S. Application Data

(60) Provisional application No. 63/780,125, filed on Mar. 28, 2025.

(51) Int. Cl.
*G06N 3/0475* (2023.01)
*G06F 16/3329* (2025.01)
*G06F 40/186* (2020.01)

(52) U.S. Cl.
CPC ........ *G06F 40/186* (2020.01); *G06F 16/3329* (2019.01)

(58) Field of Classification Search
CPC ........................... G06F 40/186; G06F 16/3329
See application file for complete search history.

(56) References Cited

U.S. PATENT DOCUMENTS

| | | | | |
|---|---|---|---|---|
| 8,341,590 | B1 * | 12/2012 | Poole ........................ | G06F 8/71 |
| | | | | 717/121 |
| 8,548,967 | B1 * | 10/2013 | Poole ........................ | G06F 8/34 |
| | | | | 707/705 |
| 2008/0114710 | A1 * | 5/2008 | Pucher ................... | G06N 20/00 |
| | | | | 706/20 |
| 2012/0095798 | A1 * | 4/2012 | Mabari .............. | G06Q 10/0637 |
| | | | | 705/7.17 |
| 2013/0166619 | A1 * | 6/2013 | Thompson ............. | G06Q 10/10 |
| | | | | 709/201 |
| 2018/0301222 | A1 * | 10/2018 | Dew, Sr. ................ | G16H 50/20 |
| 2020/0193263 | A1 * | 6/2020 | Pham ....................... | H04L 41/22 |
| 2020/0380169 | A1 * | 12/2020 | Sharan .................... | G06F 21/84 |
| 2021/0059631 | A1 * | 3/2021 | Lewis ..................... | G06F 21/84 |
| 2021/0081470 | A1 * | 3/2021 | Fisher .................... | H04L 67/10 |
| 2021/0357375 | A1 * | 11/2021 | Urdiales ................. | G06N 3/08 |

(Continued)

*Primary Examiner* — Hassan Mrabi
(74) *Attorney, Agent, or Firm* — PENILLA IP, APC

(57) ABSTRACT

A method including providing access to a content management system (CMS) via a workflow manager executed on a client browser for accessing cloud data and CMS functionality. The workflow manager generates and modifies workflows configured to interact with the cloud data. A first workflow is accessed via the workflow manager during a workflow configuration phase that defines the first workflow within the CMS, the first workflow includes one or more workflow steps that are configured for generating and editing first data via the CMS. A first workflow step is accessed in the first workflow via the workflow manager, the first workflow step includes one or more actions to be performed, wherein a first action performed in the first workflow step can be automated. The first workflow step is modified via the workflow manager by configuring a first artificial intelligence action to be performed within the first workflow step.

20 Claims, 19 Drawing Sheets

(56)  References Cited

U.S. PATENT DOCUMENTS

| | | | |
|---|---|---|---|
| 2022/0108262 A1* | 4/2022 | Cella | G05B 17/02 |
| 2022/0292465 A1* | 9/2022 | Schnitt | G06Q 30/0255 |
| 2022/0293107 A1* | 9/2022 | Leaman | G06N 20/00 |
| 2022/0343250 A1* | 10/2022 | Tremblay | G06F 3/0482 |
| 2024/0020162 A1* | 1/2024 | Parmar | G06F 9/5027 |
| 2024/0144103 A1* | 5/2024 | Cella | G05D 1/223 |
| 2024/0152840 A1* | 5/2024 | Lekas | G06Q 10/06398 |
| 2024/0220581 A1* | 7/2024 | Dines | G06F 18/217 |
| 2024/0281410 A1* | 8/2024 | Williams | G06F 16/122 |
| 2024/0362467 A1* | 10/2024 | Deo | G06N 3/0475 |
| 2024/0386015 A1* | 11/2024 | Crabtree | G06F 16/9024 |
| 2025/0063140 A1* | 2/2025 | Grillo | G06F 40/30 |
| 2025/0165893 A1* | 5/2025 | Silcock | G06F 3/0484 |
| 2025/0225161 A1* | 7/2025 | Mabey | G06N 3/0455 |

* cited by examiner

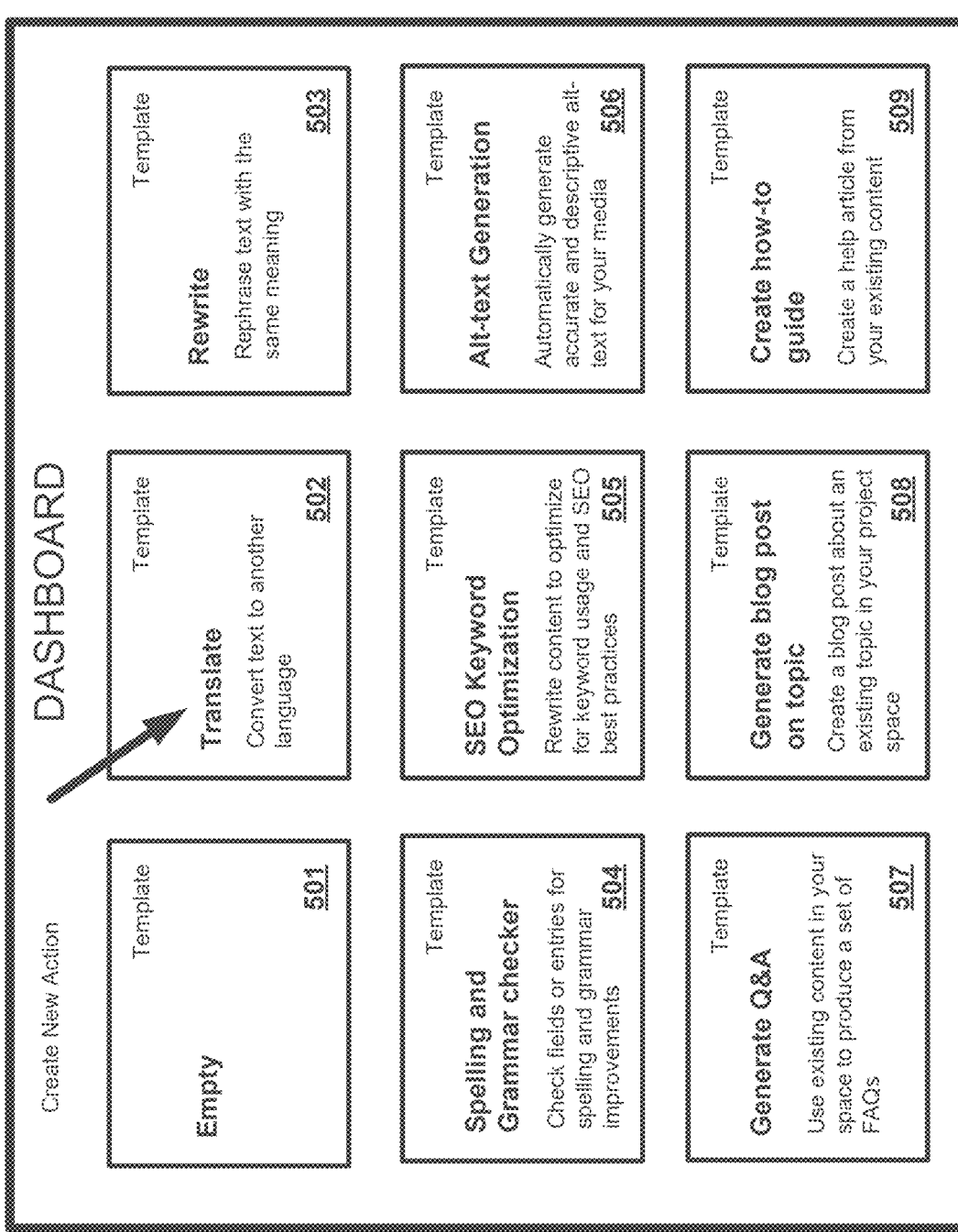

500A

DASHBOARD

Create New Action

Template

Empty

501

Template

Translate

Convert text to another language

502

Template

Rewrite

Rephrase text with the same meaning

503

Template

Spelling and Grammar Checker

Check fields or entries for spelling and grammar improvements

504

Template

SEO Keyword Optimization

Rewrite content to optimize for keyword usage and SEO best practices

505

Template

Alt-text Generation

Automatically generate accurate and descriptive alt-text for your media

506

Template

Generate Q&A

Use existing content in your space to produce a set of FAQs

507

Template

Generate blog post on topic

Create a blog post about an existing topic in your project space

508

Template

Create how-to guide

Create a help article from your existing content

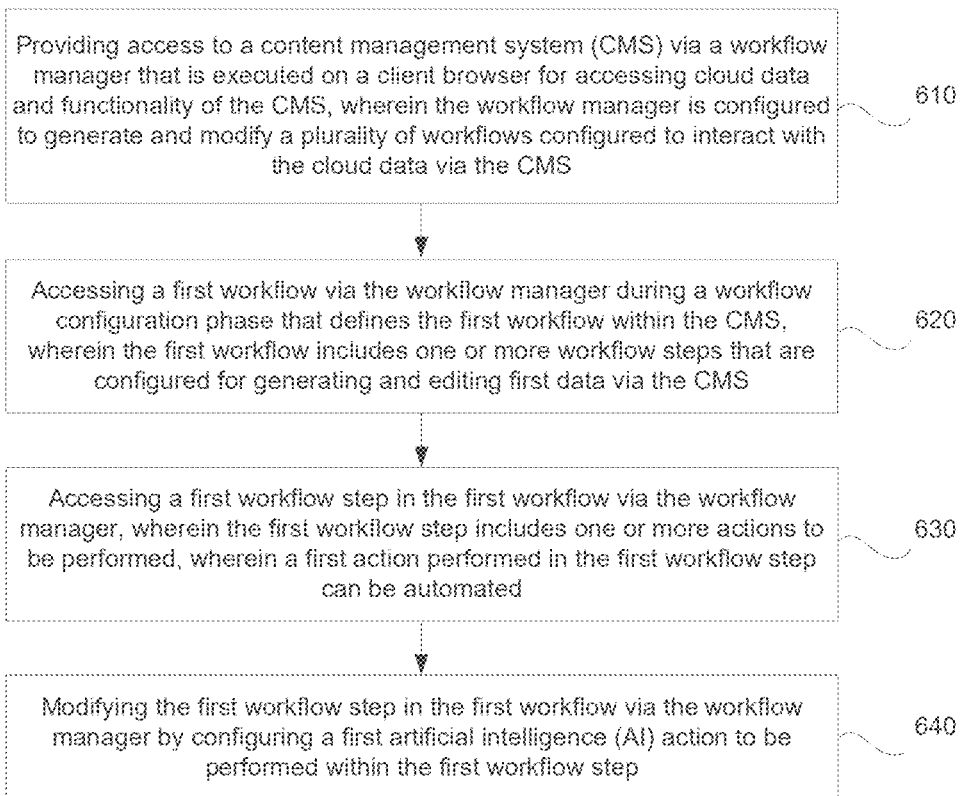

<u>600</u>

Providing access to a content management system (CMS) via a workflow manager that is executed on a client browser for accessing cloud data and functionality of the CMS, wherein the workflow manager is configured to generate and modify a plurality of workflows configured to interact with the cloud data via the CMS ～ 610

Accessing a first workflow via the workflow manager during a workflow configuration phase that defines the first workflow within the CMS, wherein the first workflow includes one or more workflow steps that are configured for generating and editing first data via the CMS ～ 620

Accessing a first workflow step in the first workflow via the workflow manager, wherein the first workflow step includes one or more actions to be performed, wherein a first action performed in the first workflow step can be automated ～ 630

Modifying the first workflow step in the first workflow via the workflow manager by configuring a first artificial intelligence (AI) action to be performed within the first workflow step ～ 640

PLAYGROUND — 990

Case 1 — 991
The quick brown fox jumps over the lazy dog.

Case 2 — 992
Add test content here ...

+ Add case — 993

RUN AI Action — 995

500C

app.contentful.com/.................../
ai_actions/..........

Translate    Published

<u>Instructions</u>    Configuration

You are an expert translation
assistant. Your sole task is to
accurately translate the provided text
into the specified locale: % Locale .
Ensure that ...

Here is the content ...

T Content
T tone of voice
T words to exclude

FIG. 7G

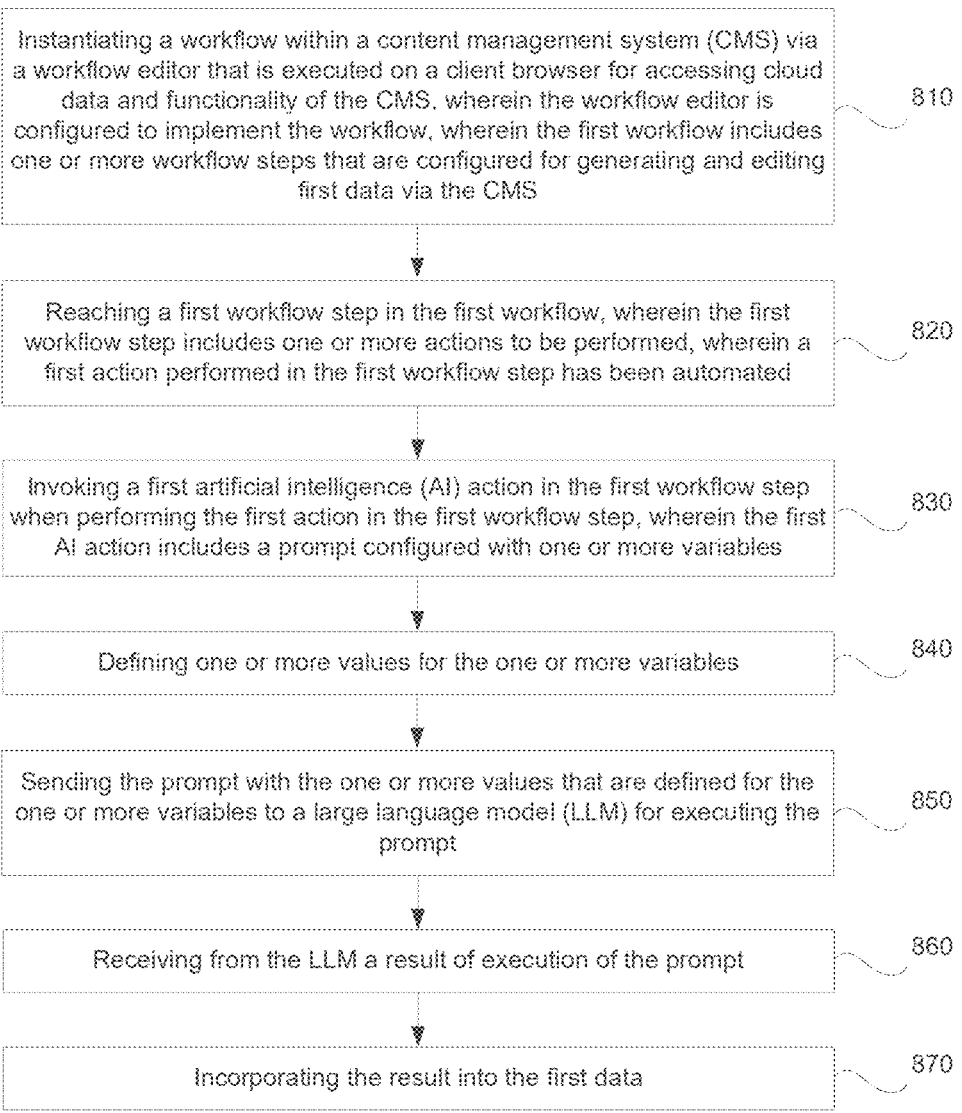

800

Instantiating a workflow within a content management system (CMS) via a workflow editor that is executed on a client browser for accessing cloud data and functionality of the CMS, wherein the workflow editor is configured to implement the workflow, wherein the first workflow includes one or more workflow steps that are configured for generating and editing first data via the CMS — 810

Reaching a first workflow step in the first workflow, wherein the first workflow step includes one or more actions to be performed, wherein a first action performed in the first workflow step has been automated — 820

Invoking a first artificial intelligence (AI) action in the first workflow step when performing the first action in the first workflow step, wherein the first AI action includes a prompt configured with one or more variables — 830

Defining one or more values for the one or more variables — 840

Sending the prompt with the one or more values that are defined for the one or more variables to a large language model (LLM) for executing the prompt — 850

Receiving from the LLM a result of execution of the prompt — 860

Incorporating the result into the first data — 870

INCORPORATING ARTIFICIAL INTELLIGENCE ACTIONS IN WORKFLOWS IMPLEMENTED IN A CONTENT MANAGEMENT SYSTEM

CROSS REFERENCE TO RELATED APPLICATIONS

The present application claims priority to and the benefit of the commonly owned, provisional patent application, U.S. Ser. No. 63/780,125, entitled "INCORPORATING ARTIFICIAL INTELLIGENCE ACTIONS IN WORK-FLOWS IMPLEMENTED IN A CONTENT MANAGE-MENT SYSTEM," with filing date of Mar. 28, 2025, which is herein incorporated by reference in its entirety.

TECHNICAL FIELD

The present disclosure is related to artificial intelligence (AI), and more particularly AI-driven content generation and transformation, particularly in the context of content management systems. Users (e.g., administrators and/or editors) are able to define, control, and execute AI-powered content actions dynamically, leveraging prompt engineering, model selection, and variable-based customization that guide the use of artificial intelligence on how to interact with content managed by the content management systems.

BACKGROUND OF THE DISCLOSURE

A content management system (CMS) provides many benefits by allowing users to flexibly structure and manage content, independent of the presentation of such content through various contexts such as websites and mobile apps. Content can be composed in a modular format, enabling an individual piece of content to be created once, and then reused across different presentation contexts. Further, the appearance of content can be adjusted to suit the presentation context at the time it is retrieved and presented to the consuming end user.

Marketing teams struggle to produce and distribute high-quality content efficiently across multiple variants, channels, brands and markets. Content workflows can be utilized to generate marketing content. However, the marketing teams rely on fragmented workflows and independent tools for customizing the workflows, thereby creating content incon-sistencies, team inefficiencies and technical dependencies that slow down a content generation and use lifecycle. This leads to increased costs, missed opportunities to drive return on investment and inconsistent audience engagement across channels.

It is in this context that embodiments of the disclosure arise.

SUMMARY

Embodiments of the present disclosure relate to imple-menting artificial intelligence (AI) in a content management system (CMS). Users (e.g., an administrator and/or editor) are able to configure models, prompts and variables, and provide specific instructions that guide the use of artificial intelligence on how to interact with content managed by the CMS to provide for AI-driven content generation and/or transformation. Users can modify these instructions in a playground feature to fine-tune how customized AI actions behave, thereby allowing the users to tailor corresponding AI actions to their specific needs. Users also have the additional ability to incorporate custom or context-aware variables into these instructions. In some embodiments, users experience these more complex prompts as push buttons or even fully automated functionalities that do not require manual triggers.

In one embodiment, a method is disclosed. The method including providing access to a content management system (CMS) via a workflow manager that is executed on a client browser for accessing cloud data and functionality of the CMS, wherein the workflow manager is configured to gen-erate and modify a plurality of workflows configured to interact with the cloud data via the CMS. The method including accessing a first workflow via the workflow man-ager during a workflow configuration phase that defines the first workflow within the CMS, wherein the first workflow includes one or more workflow steps that are configured for generating and editing first data via the CMS. The method including accessing a first workflow step in the first work-flow via the workflow manager, wherein the first workflow step includes one or more actions to be performed, wherein a first action performed in the first workflow step can be automated. The method including modifying the first work-flow step in the first workflow via the workflow manager by configuring a first artificial intelligence (AI) action to be performed within the first workflow step.

In still another embodiment, a computer system is dis-closed, wherein the computer system includes a processor and memory coupled to the processor and having stored therein instructions that, if executed by the computer system, cause the computer system to execute a method. The method including providing access to a content management system (CMS) via a workflow manager that is executed on a client browser for accessing cloud data and functionality of the CMS, wherein the workflow manager is configured to gen-erate and modify a plurality of workflows configured to interact with the cloud data via the CMS. The method including accessing a first workflow via the workflow man-ager during a workflow configuration phase that defines the first workflow within the CMS, wherein the first workflow includes one or more workflow steps that are configured for generating and editing first data via the CMS. The method including accessing a first workflow step in the first work-flow via the workflow manager, wherein the first workflow step includes one or more actions to be performed, wherein a first action performed in the first workflow step can be automated. The method including modifying the first work-flow step in the first workflow via the workflow manager by configuring a first artificial intelligence (AI) action to be performed within the first workflow step.

In another embodiment, a non-transitory computer-read-able medium storing a computer program for performing a method is disclosed. The non-transitory computer-readable medium including program instructions for providing access to a content management system (CMS) via a workflow manager that is executed on a client browser for accessing cloud data and functionality of the CMS, wherein the workflow manager is configured to generate and modify a plurality of workflows configured to interact with the cloud data via the CMS. The non-transitory computer-readable medium including program instructions for accessing a first workflow via the workflow manager during a workflow configuration phase that defines the first workflow within the CMS, wherein the first workflow includes one or more workflow steps that are configured for generating and edit-ing first data via the CMS. The non-transitory computer-readable medium including program instructions for access-ing a first workflow step in the first workflow via the workflow manager, wherein the first workflow step includes one or more actions to be performed, wherein a first action performed in the first workflow step can be automated. The non-transitory computer-readable medium including program instructions for modifying the first workflow step in the first workflow via the workflow manager by configuring a first artificial intelligence (AI) action to be performed within the first workflow step.

In another embodiment, a system is disclosed. The system including a content management system (CMS), the CMS is a headless CMS that enables creation or editing of content that is accessible over the internet. The system including a server side workflow manager configured to generate and modify a plurality of workflows configured to interact with the cloud data via the CMS. The system including a plurality of artificial intelligence (AI) templates, wherein each of the plurality of AI action templates is configured to perform a corresponding action using artificial intelligence. The server side workflow manager interfaces with a web workflow manager executed on a first client browser to define a first workflow within the CMS, wherein the first workflow includes one or more workflow steps that are configured for generating and editing first data via the CMS. The server side workflow manager interfaces with the web workflow manager to access a first workflow step in the first workflow, wherein the first workflow step includes one or more actions to be performed, wherein a first action performed in the first workflow step can be automated. The server side workflow manager interfaces with the web workflow manager to modify the first workflow step in the first workflow via the workflow manager by configuring a first artificial intelligence (AI) action to be performed within the first workflow step.

In another embodiment, a method is disclosed. The method including instantiating a workflow within a content management system (CMS) via a workflow editor that is executed on a client browser for accessing cloud data and functionality of the CMS, wherein the workflow editor is configured to implement the workflow, wherein the first workflow includes one or more workflow steps that are configured for generating and editing first data via the CMS. The method including reaching a first workflow step in the first workflow, wherein the first workflow step includes one or more actions to be performed, wherein a first action performed in the first workflow step has been automated. The method including invoking a first artificial intelligence (AI) action in the first workflow step when performing the first action in the first workflow step, wherein the first AI action includes a prompt configured with one or more variables. The method including defining one or more values for the one or more variables. The method including sending the prompt with the one or more values that are defined for the one or more variables to a large language model (LLM) for executing the prompt. The method including receiving from the LLM a result of execution of the prompt. The method including incorporating the result into the first data.

In still another embodiment, a computer system is disclosed, wherein the computer system includes a processor and memory coupled to the processor and having stored therein instructions that, if executed by the computer system, cause the computer system to execute a method. The method including instantiating a workflow within a content management system (CMS) via a workflow editor that is executed on a client browser for accessing cloud data and functionality of the CMS, wherein the workflow editor is configured to implement the workflow, wherein the first workflow includes one or more workflow steps that are configured for generating and editing first data via the CMS. The method including reaching a first workflow step in the first workflow, wherein the first workflow step includes one or more actions to be performed, wherein a first action performed in the first workflow step has been automated. The method including invoking a first artificial intelligence (AI) action in the first workflow step when performing the first action in the first workflow step, wherein the first AI action includes a prompt configured with one or more variables. The method including defining one or more values for the one or more variables. The method including sending the prompt with the one or more values that are defined for the one or more variables to a large language model (LLM) for executing the prompt. The method including receiving from the LLM a result of execution of the prompt. The method including incorporating the result into the first data.

In another embodiment, a non-transitory computer-readable medium storing a computer program for performing a method is disclosed. The non-transitory computer-readable medium including program instructions for instantiating a workflow within a content management system (CMS) via a workflow editor that is executed on a client browser for accessing cloud data and functionality of the CMS, wherein the workflow editor is configured to implement the workflow, wherein the first workflow includes one or more workflow steps that are configured for generating and editing first data via the CMS. The non-transitory computer-readable medium including program instructions for reaching a first workflow step in the first workflow, wherein the first workflow step includes one or more actions to be performed, wherein a first action performed in the first workflow step has been automated. The non-transitory computer-readable medium including program instructions for invoking a first artificial intelligence (AI) action in the first workflow step when performing the first action in the first workflow step, wherein the first AI action includes a prompt configured with one or more variables. The non-transitory computer-readable medium including program instructions for defining one or more values for the one or more variables. The non-transitory computer-readable medium including program instructions for sending the prompt with the one or more values that are defined for the one or more variables to a large language model (LLM) for executing the prompt. The non-transitory computer-readable medium including program instructions for receiving from the LLM a result of execution of the prompt. The non-transitory computer-readable medium including program instructions for incorporating the result into the first data.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 5A illustrates a user interface presenting a dashboard of a plurality of AI action templates that can be configured for customized use in workflows or for direct implementation, in accordance with one embodiment of the present disclosure.

FIG. 6 is a flow diagram illustrating a method for integrating artificial intelligence into a workflow by configuring an AI action, during a configuration phase, that can be inserted into the workflow, in accordance with one embodiment of the present disclosure.

FIG. 7G illustrates a user interface for testing an AI action that has been configured, in accordance with one embodiment of the present disclosure.

FIG. 8 is a flow diagram illustrating a method for executing an AI action that is configured for execution in a workflow during an implementation phase of the AI action, in accordance with one embodiment of the present disclosure.

DETAILED DESCRIPTION

Figure 1:
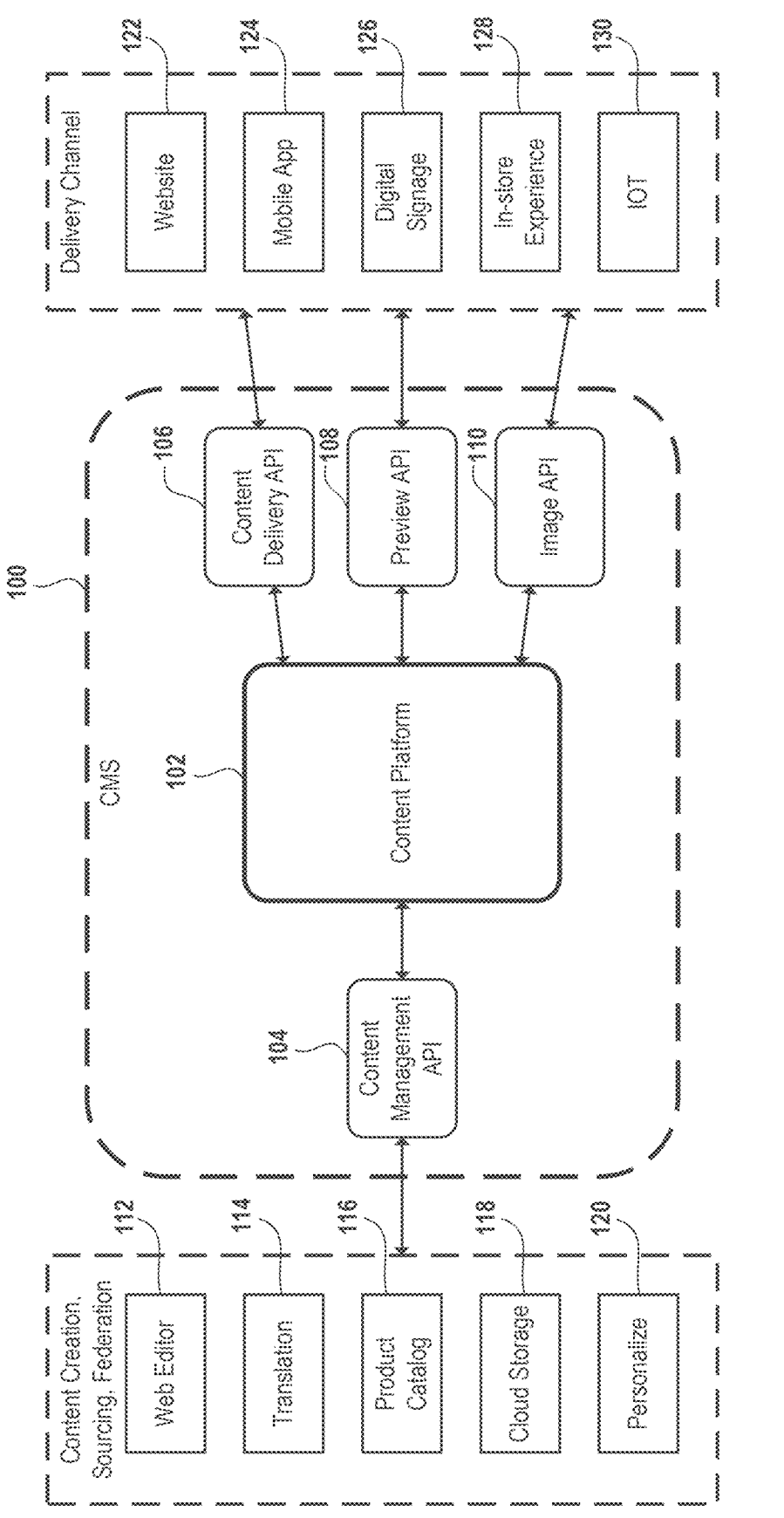
FIG. 1 conceptually illustrates a content management system (CMS), and entities that interact with the CMS, in accordance with implementations of the disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure are set forth without any loss of generality to, and without imposing limitations upon, the claims that follow this description.

Generally speaking, the various embodiments of the present disclosure describe systems and methods for configuring one or more AI actions and implementing those AI actions in corresponding workflows or on specified content, wherein an AI action provides a customized prompt to a large language model (LLM) for execution to perform a specific function and/or action using artificial intelligence. Customizable AI actions empower users (e.g., administrators and/or editors) to create, configure, and execute AI-driven content transformation and generation use cases on demand. In particular, by combining prompts, models, and variables, users can define and refine AI actions to perform actions and/or functions that are tailored to their specific needs. For example, users can incorporate custom or context-aware variables into a corresponding prompt to automate performance of an action or functionality using artificial intelligence. These variables act as contextual parameters, and enhance the accuracy and usability of AI generated content. Variables are resolved upon runtime invocation of an AI action, and depending on their configuration can provide different aspects of additional context, such as by enriching the AI action with external data. Embodiments of the disclosure enable users to start from scratch or leverage prebuilt AI action templates, thereby providing flexibility and efficiency in AI-powered content automation. Specifically, users are able specify the scope of AI actions, determine whether they apply to entire content containers, or specific parts of content, or other related content entities. AI actions can dynamically incorporate context from within a content management system (CMS) (e.g., Contentful GmbH or Contentful.com) or external data sources. This means content, assets, and experiences can be referenced and resolved in real time during AI execution, allowing for scalable automation. Additionally, external data, such as assets from digital asset management (DAM) or brand profiles, can be dynamically referenced as AI action inputs. Additionally, AI actions offer versatile execution modes, enabling manual invocation, bulk processing across content entities, or seamless automation as part of business workflows and broader automation strategies. Also, one key aspect of AI actions is its extensibility and control over large language models (LLMs), such that users can select from a variety of AI models, including the integration of proprietary models via application programming interface (API) calls and/or keys, or utilize customized models for specialized tasks. Further, users have complete visibility into where and how AI is applied, as well as what data it processes, thereby safeguarding their brand and business integrity. To ensure high-quality results, AI actions allows users to test AI action prompts against existing or custom content before deploying them across content management teams. This testing phase ensures that AI action prompts produce the desired output, improving consistency and reducing the need for post-generation adjustments. AI actions can be triggered directly from workflow steps, enabling automated AI transformations at scale while ensuring all AI-generated output is verified before release. In summary, embodiments of the present disclosure streamlines AI integration, optimizes content workflows, and provides an intuitive interface for managing AI-driven content transformation with precision and control.

The demand for AI-generated content has increased significantly in recent years, driven by advancements in large language models (LLMs) and generative AI. Businesses across industries leverage AI to enhance content creation, improve customer engagement, and automate repetitive content tasks. Embodiments of the present disclosure provide several advantages over existing AI solutions. First, existing AI-powered content tools lack customization and control, as these existing tools provide predefined templates or rigid workflows, limiting users' ability to fine-tune content generation. Users have minimal control over how AI models interpret prompts or generate outputs, leading to inconsistencies in tone, structure, and accuracy. On the other hand, embodiments of the present disclosure providing for AI actions provide for the ability to define AI actions with granular control over prompts, models, and execution parameters; and provide for customization of AI-generated content by using dynamic variables that influence tone, style, and contextual relevance. That is, unlike rigid AI automation tools, AI Actions provides deep customization through prompt tuning, variable control, and execution flexibility. Controls and the ability to provide inputs at the time of triggering an AI action for execution are given to end users, who edit and transform content. These controls provide execution flexibility and are defined when configuring an AI action by a user (e.g., administrator). Second, existing AI-powered content tools provide limited model flexibility and integration, as these existing tools are tied to specific AI models, thereby restricting users from leveraging multiple models or integrating proprietary AI solutions; and organizations that require domain-specific fine-tuned models struggle to integrate their own AI models into commercial content platforms. On the other hand, embodiments of the present disclosure providing for AI actions can be integrated for use by multiple AI models, with selection of a best AI model for each task, by utilizing APIs of external third party AI models, and/or APIs of fine-tuned proprietary models. That is, an AI action platform supports multiple AI models, proprietary API integrations, and fine-tuned models, allowing businesses to use the most suitable AI for their needs. Third, existing AI-powered content tools provide inconsistent content quality and context awareness, as these existing tools generate AI-generated content that often fails to align with brand guidelines, customer segmentation, or contextual nuances. Further, existing tools do not provide standardized mechanisms for testing and refining AI-generated content before widespread implementation. On the other hand, embodiments of the present disclosure providing for AI actions provide for the testing and refinement of prompts of AI actions before execution to ensure accuracy and quality of the AI-generated content output from execution of the prompts. That is, quality assurance is enabled through the ability to test and refine prompts before deployment ensures accuracy and alignment with brand guidelines. Fourth, existing AI-powered content tools are inefficient at scaling as existing tools often require manual execution for content generation, or making bulk operations that can be cumbersome and time consuming; and further existing tools limit automation within a workflow that prevents seamless AI-driven content management at scale. On the other hand, embodiments of the present disclosure providing for AI actions provide for the execution of AI actions efficiently across different contexts, including manual invocation of an AI action, bulk invocation of an AI action, and automation of steps within a workflow using corresponding AI actions. As a result, embodiments of the present disclosure providing for AI actions provide a flexible, configurable, and scalable AI-driven content transformation solution, by providing a modular, extensible, and automation-ready AI-powered content transformation framework, enabling businesses to harness AI in a controlled, scalable, and brand-aligned manner. That is, AI Actions support manual, bulk, and automated executions, making them suitable for both small-scale and enterprise-level AI-driven content operations.

Throughout the specification, the term 'AI action' is used in reference to an action or function that is automated using artificial intelligence. Configuration of a corresponding AI action, such as providing a prompt and variables during a configuration phase, allows for subsequent use of the configured AI action to perform the corresponding action in a context aware manner. Specifically, by defining values for the variables a context is set for the corresponding AI action, and the context-aware AI action is executed to perform the corresponding action in the desired manner.

With the above general understanding of the various embodiments, example details of the embodiments will now be described with reference to the various drawings.

FIG. 1 conceptually illustrates a content management system (CMS) 100, and entities that interact with the CMS 100, in accordance with implementations of the disclosure. In particular, the CMS 100 is suitable for configuring and implementing AI actions for the generation and transformation of AI-driven content.

Broadly speaking, a content management system (CMS) is a system that facilitates and manages the creation, storage, editing, and delivery of digital content. One example of a CMS is provided by Contentful GmbH (https://www.contentful.com). In a CMS in accordance with implementations of the disclosure, content can be distinguished from the context/channel in which such content is presented. That is, content is modularized and separated from its appearance in a given presentation context through which the content is presented and actually consumed by the end user. Examples of presentation contexts include websites, mobile apps, digital signage, in-store digital experiences, etc.

Content generally consists of content items which can be of various types. Examples of types of content items include text, images, audio, video, data values, etc. Content items are typically stored as data structures in the CMS (e.g., JSON data structures containing text, metadata, links, tags, etc.), and in some implementations, include raw text, media, or data files. Hence, content is stored and delivered in a generic format, and formatting is later applied in the end application that defines the presentation context. For example, appearance determinations such as fonts, colors, alignment, etc. are applied to text or media content items by a website or mobile app. Thus, the final appearance of content is not determined at its creation, but rather is dynamically determined by the context in which the content will appear.

Content items can be flexibly configured to enable specific content items for specific purposes to be defined. For example, the content items which comprise a typical rendering of a news article by a newspaper/publication may include the following: title of the newspaper/publication, place/location, date, copyright information, article title, subtitle, author, body, photo/image, photographer name, photo/image caption, etc. Each of these content items can be separately stored and independently delivered as needed to suit different contexts of presentation. For example, a news article appearing on a news website will be configured to present the article in a different format/style than when the same article appears in a social media feed, on a digital sign, or in another context.

Broadly speaking, the CMS 100 provides a content platform 102 to unify and structure content for improved content management and delivery. Access to and management of the content is provided through various application programming interfaces (API's). In some implementations, creation, editing, federation and other management of content is mediated through a content management API 104. In some implementations, the content management API 104 is a read-write API for managing content. In some implementations, the content management API 104 requires authentication as a user of the CMS. The content management API 104 enables one to programmatically create or update content items. It will be appreciated that the content management API 104 can be used for a variety of purposes, including by way of example without limitation, creation and editing of content in the content platform, automatic imports from other content sources/repositories, integration with other backend systems (e.g., an e-commerce shop), building custom editing experiences, etc.

For example, a web editor 112 is implemented to provide a web-based user interface for creating and editing content, the web editor accessing the content management API to generate new content items in the system, retrieve and edit existing content items, store changes to content items, etc.

In some implementations, content is localized in part by translation logic 114, which enables translation (in some implementations, causes translations) of the content into the local language of the delivery context. Thus, translation logic 114 may access the content management API 104 to retrieve, generate, and store translations of content in the CMS 100, as well as configure such translations for presentation in the appropriate contexts.

In some implementations, the content platform 102 of the CMS 100 can be integrated with other systems via the content management API 104. In some implementations, content can be sourced/mined/imported from, or synchronized with, an existing repository of content. For example, an existing product catalog 116 may be maintained including information about products such as product names, categorizations, descriptions, price information, related media, etc. and such a product catalog system can be configured to import or update content, or otherwise effect content management actions so as to integrate with the CMS 100 via the content management API 104. In some implementations, a cloud storage system 118 can similarly integrate with the CMS 100 via the content management API 104.

In some implementations, a personalization system 120 is enabled to affect and/or provide content personalization via the content management API 104. Personalization information can be utilized to enable customization of content or downstream customization of content delivery. Examples of personalization information can include user demographic information (e.g., age, gender, ethnicity, etc.), geolocation, user content consumption history, user preference information, user purchase history, etc. Such personalization information can be utilized by the personalization system 120 to customize content via the content management API, and the selection and presentation of content through a given context.

As noted, content is separated from its presentation, so that the specific appearance of delivered content is determined by or otherwise based on the downstream context/ channel through which the content is delivered (e.g., website, mobile app, digital signage, in-store experience, etc.). To this end, various API's are provided for enabling such presentation contexts/channels to access the CMS (e.g., via API calls) to obtain the appropriate content for presentation. For example, a content delivery API 106 is exposed to enable retrieval of content items and delivery of said content items to the presentation context. In some implementations, the content delivery API 106 is configured as a read-only API for delivering content from the CMS 100 to apps, websites and other media. In some implementations, content can be delivered as JSON data, and images, videos and other media as files. The content delivery API 106 can be made available via a globally distributed content delivery network (CDN), so that the server closest to the user serves all content, both JSON and binary. This minimizes latency, which especially benefits potentially bandwidth constrained delivery contexts, such as mobile apps. Hosting content in multiple global data centers also greatly improves the availability of content.

In some implementations, a content preview API 108 is provided, which is a variant of the content delivery API 106 for previewing content before delivering it to live customers. The content preview API 108 can be used in combination with a preview deployment, e.g., preview deployment of a website or a preview build of a mobile app, that allows content managers and authors to view their work in-context, as if it were published, using a preview access token as though it were delivered by the content delivery API 106.

In some implementations, an images API 110 is provided, enabling image transformations/adjustments, such as resizing and cropping of images, changing their background color and converting them to different formats. Using the images API 110 for these transformations allows users to upload high-quality assets, while delivering images suitable and optimized for the delivery channel, and leveraging the benefits of a caching content delivery network.

It will be appreciated that content can be delivered from the CMS 100 to any of various delivery channels/contexts, such as a website 122, mobile app 124, digital signage 126, in-store experience 128, Internet-of-things (IOT) device 130, etc.

In some implementations, the CMS 100 is configured to have the following main entity types: user, organization, space, and environment.

A user is an entity with an account in the CMS. Users can be invited to an existing organization, or sign up individually. If a user has signed up individually, a new organization is automatically created. An existing user can create additional organizations or be invited to other existing organizations. In some implementations, users have management authentication credentials attached to them, such as OAuth applications, OAuth tokens, and personal access tokens.

An organization is an entity that serves as a way to group users and group spaces (content projects). In some implementations, the organization also links member users to a billing entity, so subscriptions and invoices are tied to the organization, rather than to a specific user.

In some implementations, the CMS implements a role-based access model. For example, users can be invited to join an organization and those users will have different levels of access based on their organizational role.

In some implementations of the CMS, a space or a content project is a child of the organization, and serves as a container for the organization's content and any settings related to that content. Spaces allow one to separate data according to the structure of projects or services.

Various settings can apply to a given space or content project. For example, users of a space can be defined as members of the parent organization who belong to the space, and their respective access roles can be defined. Roles and permissions can be defined to set user access levels within the space. API keys can be defined, so that in order to retrieve content through one of the CMS's APIs, a key has to be provided for authentication. For example, in some implementations, an API key is required to be provided in order to access published content through the content delivery API or to access unpublished content through the preview API. Webhooks can be configured to send requests (e.g., HTTP requests) triggered by changes to a content model, content, or media. Content preview functionality is supported, providing a link within the entry editor to a pre-production environment that uses the preview API to access unpublished content.

In some implementations of the CMS, environments are defined as entities within a space that allow one to create and maintain multiple versions of the space-specific data and configuration, and make changes to them in isolation. Hence, in some implementations, each space has one environment by default, which may be termed a master environment. Additionally, multiple sandbox environments can be created. These sandbox environments allow one to modify the data in a space without affecting the data in the master environment. In some implementations, an environment alias can be implemented to allow one to access and modify the data of a target environment, through a different static identifier. For example, a master alias ID can be implemented to reference or point to the environment that is deemed to be the current production version, and accordingly API calls using the master alias ID will access the referenced environment. It will be appreciated that the master alias ID can be easily switched to another environment as needed, conveniently facilitating rollout of a new version of content or rollback to a prior version.

In some implementations, environments include a content model, content, and media. The content model is a collection of content types, which define the structure of the content. The content is defined as a collection of entries. Media is defined as a collection of assets.

A plurality of settings can apply to environments. For example, in some implementations, there are locales settings to manage and deliver content in multiple languages, or otherwise customize content delivery based on delivery geo-location. In some implementations, user interface (UI) extensions are supported, to enable building of customized editing experiences for the web editor. In some implementations, app installations are supported, extending and expanding the capabilities of the CMS web application.

Figure 2:
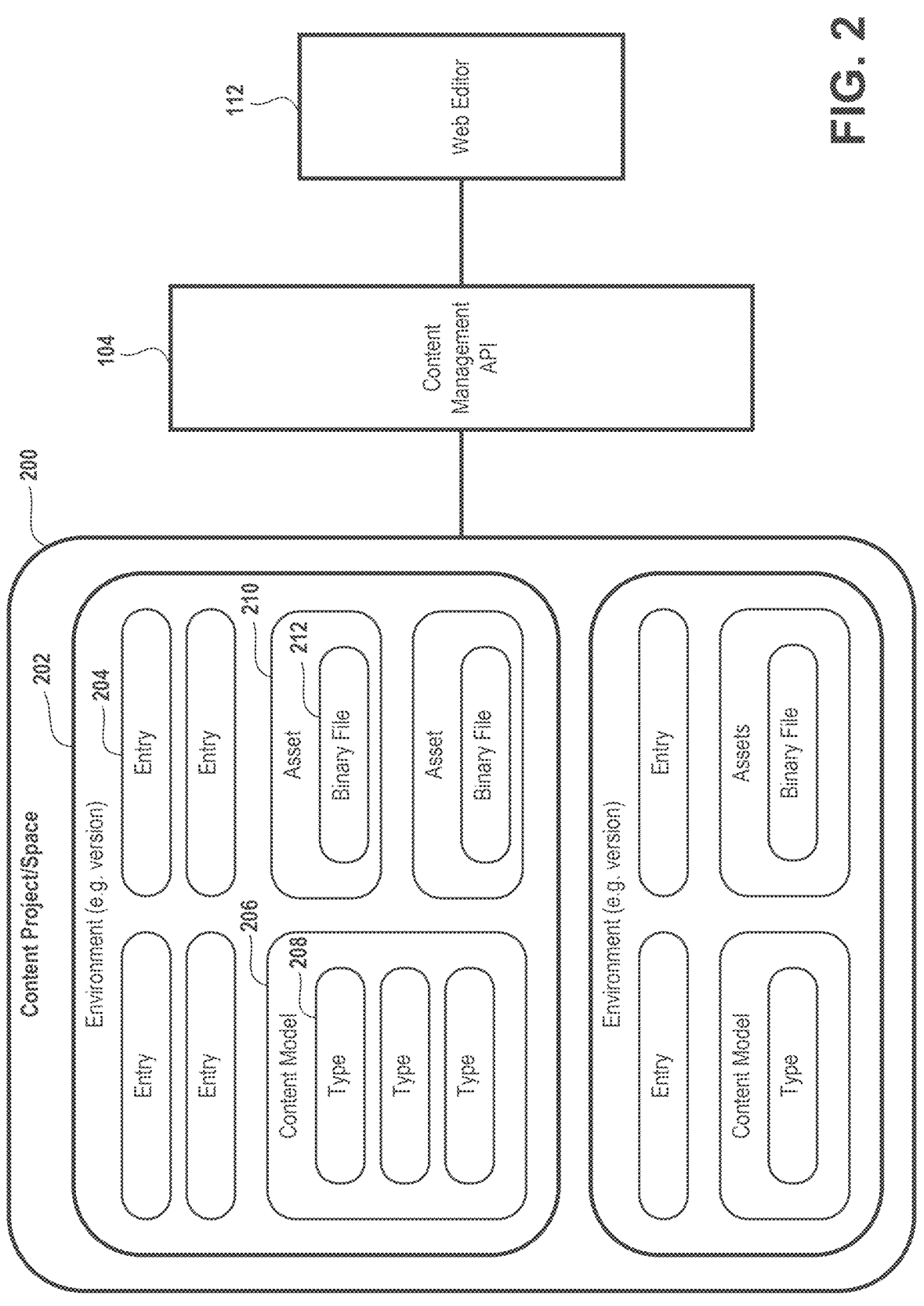
FIG. 2 conceptually illustrates a content project (also termed a space), in accordance with implementations of the disclosure.

FIG. 2 conceptually illustrates a content project (also termed a space), in accordance with implementations of the disclosure.

In the illustrated implementation, content is organized in content projects, such as an exemplary content project 200, that groups together all the related resources for a given project. This can include content entries, media assets, and settings for localizing content into different languages. Each content project has a content model that represents and defines the content types one can create for the content project.

In some implementations, all content types have standard fields that contain basic information about the content type, its fields and meta data (e.g., system properties, name of the content type, description of the content type, listing of fields, ID of main field used for display, etc.). Each content type is flexibly configurable, further consisting of user-defined fields, which in some implementations, correspond to a JSON type (e.g., string, number, object, boolean, array). Examples of user-defined fields include the following: text, number, date and time, location (coordinates), boolean, media (links to an asset), reference (links to an entry or object), array, JSON object. It will be appreciated that array fields can contain multiple values which can include strings, links to other entries or assets, etc. An array field may have an items property defining the allowed values in the array. Individual fields can also contain metadata, such as validations and widget appearance.

Individual items of content are stored in the CMS as entries (e.g., entry 204), which represent textual or structural information based on the content type used. Items can also be assets (e.g., asset 210), which can include binary files (e.g., binary file 212), such as images, videos or documents, along with metadata. In some implementations, assets have the following fields: the name, description and attached file.

In summary, a content project contains all the content that is functional to one project, and an environment is a way to express one version of one project. An example use case for multiple environments as part of a given content project would be a scenario in which there is a current version of one's website and a future holiday version of the website that is not in production yet, but being worked on. There can be a first environment that contains the content for the current version being actively served to customers, while in parallel work is proceeding on a second environment which is for the future holiday version to be released.

Further, content in a given environment of a content project consists of entries and assets, with each entry being of a user-defined type that specifies the fields of a given entry. Thus, each entry is a unit of content in the system of a type that is flexibly defined by the user and capable of being adapted to suit a given purpose.

For purposes of illustration, an example of a content model for a product catalogue might include content types for a category (identifying what product type), a brand (identifying who made the product), and a product (an item for sale that references a category and a brand). Further, the brand content type might consist of several fields, such as a company name, logo, description, electronic contact information (website, social media, email address), phone number, etc.

Entries can have link (or reference) fields which point to other entries or assets. An example use case for a restaurant might include the following: a restaurant linking to its menu (singular relationship), a menu linking to its specific menu items (plural relationship), each menu item linking to a photo (attachment), a restaurant linking to multiple photos (attachments). The content delivery API can be structured so that a single HTTP request retrieves the entire set of linked resources above, starting with the menu, in one request. A CDN can cache these requests to further speed up future requests. This is useful for consuming apps (and especially mobile apps) as it reduces the need for multiple concurrent connections or servicing of serially dependent requests, and reduces the latency for results to return.

Links also provide additional advantages in that relationships are clearly defined and validated by specific content type fields. Entry links can be validated by content type (e.g., only allow Menu Items for fields.menuItems). Asset links can be validated by file type. (e.g., only allow Images for fields.photo). Links on the Content Delivery API are resolved using the published entries and assets, while links on the Content Preview API will resolve using the draft entries and assets.

Figure 3:
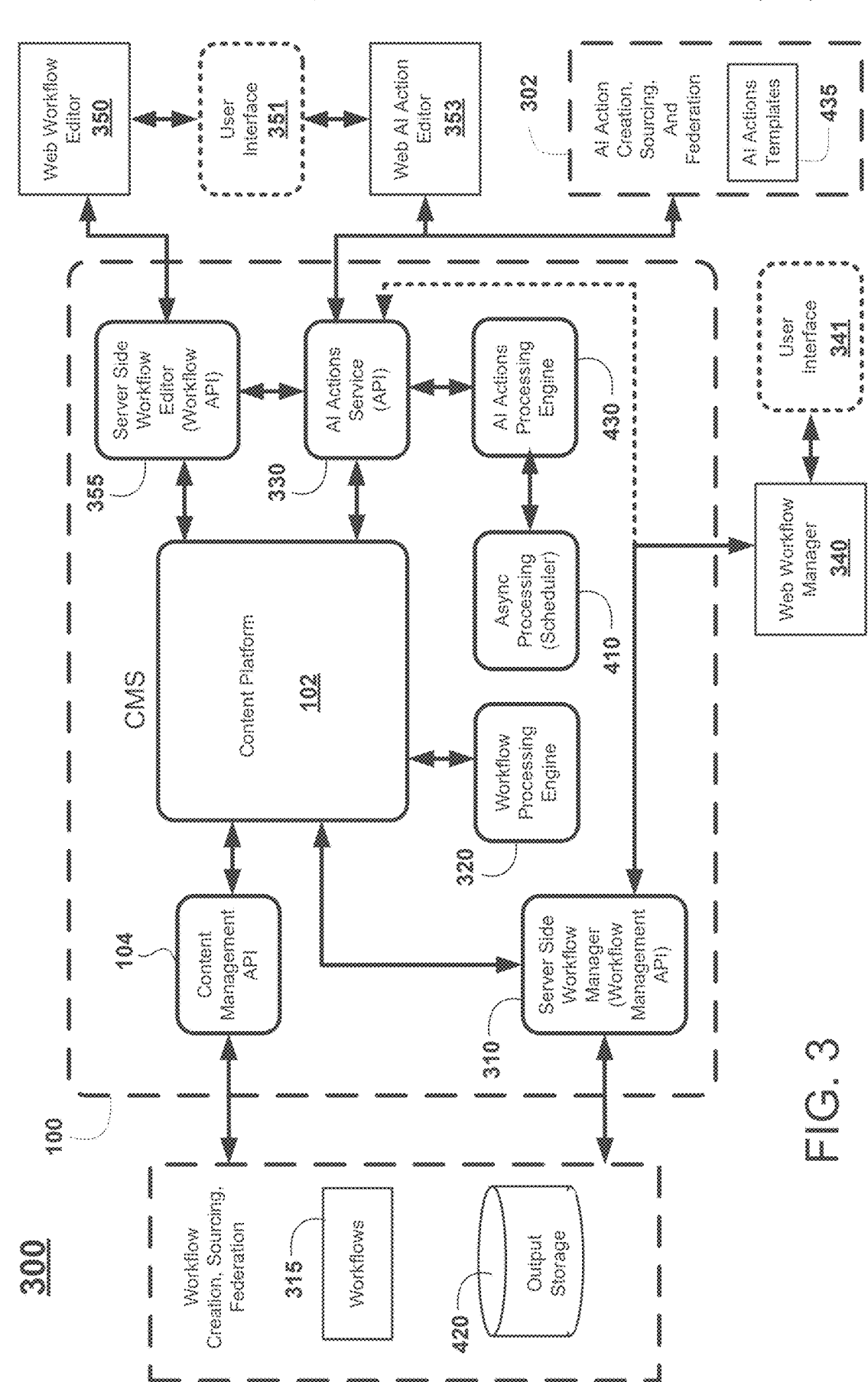
FIG. 3 illustrates a system for configuring AI actions during a configuration phase and for implementing AI actions during an implementation phase in a CMS, in accordance with one embodiment of the present disclosure.

FIG. 3 illustrates an AI action system or platform 300 for configuring AI actions during a configuration phase and for implementing AI actions during an implementation phase in a CMS, in accordance with one embodiment of the present disclosure. System 300 may be integrated within or work cooperatively with the CMS system 100 of FIG. 1 to provide AI action functionality.

The AI action platform 300 provides a flexible and extensible AI-powered content automation framework that enables users to create, configure, and execute AI-driven content transformation and generation tasks with precision and control through the configuration (e.g., configuration phase) and definition (e.g., implementation phase) of AI actions. In particular, the AI action platform 300 introduces a modular system that allows users (e.g., administrators and/or editors) to define AI actions using a combination of prompts (instructions to AI models), configuration of AI models, and variables, thereby ensuring adaptable and context-aware AI-generated content.

The AI action platform 300 provides customization of AI actions. In particular, unlike rigid AI automation tools, AI Actions provides deep customization through prompt tuning, variable control, and execution flexibility. Further, the AI action platform 300 provides for interoperability by supporting multiple AI models, proprietary API integrations, and fine-tuned models, thereby allowing content creators and/or other businesses to use the most suitable AI model for their needs. Also, the AI action platform 300 provides for quality assurance, by providing the ability to test and refine prompts before deployment ensures accuracy and alignment with brand guidelines. Moreover, the AI action platform 300 provides for scalability by supporting manual, bulk, and automated executions, thereby making AI actions suitable for both small-scale and enterprise-level AI-driven content operations CMS 100 can be modified to include and utilize one or more components of the AI action platform 300 to enable the configuration and/or implementation of AI actions. For example, workflow and AI action creation, sourcing federation blocks 301 and 302 include various items and/or data relevant to the creation and/or implementation of workflows or AI actions.

In particular, a plurality of workflows 315 is accessed via CMS 100 for purposes of creating, managing, and/or storing workflows. Workflows may be stored in output storage 420, wherein the output storage may be operated internally as part of CMS 100, or operated remotely, as managed by CMS, or as managed by a third party storage service. As previously described, a workflow may be a series of steps developed by an entity (e.g., organization, content creator, etc.) that are performed to accomplish a particular task, such as, for example generating content, editing content, performing research on a topic, and/or draft a document, etc. That is, a workflow can be generated to accomplish any task. Further, the workflow can be repeatedly used to perform the task under different contexts. For example, a content based website may utilize a workflow multiple items to generate different items of content. As an illustration, a workflow may be created by a book website selling books to generate informational biographies on authors, such as a 'bio' for each author that customers of the book website have interest.

Also, a plurality of AI action templates 435 is accessed via CMS 100 for purposes of creating, management, and/or storing the templates. AI action templates may be generated by the content management system (CMS) provider (e.g., Contentful GMBH, other CMS providers, users of any content management system, third parties providing templates through a marketplace, etc. AI action templates may be stored in output storage 420, as previously described. Each of the plurality of AI action templates corresponds with an AI action, that can be configured and/or defined to perform a specific action (e.g., task, function, etc.) using artificial intelligence. Each AI action template is generic to users of the CMS 100 (e.g., organizations, individuals, etc.), as made available by the CMS 100 (e.g., Contentful.com) and can be customized by each user (e.g., by an administrator) for use within an organization through a configuration phase that configures a corresponding AI action template, for example as an AI action (that has been configured) available to users (e.g., editors) of that organization. In other embodiments, an AI action template is available to any end user (e.g., individual users, users part of a group or organization, users part of a sharing group, etc.) that has permission for accessing the AI action template in order to invoke a corresponding AI action, such as part of a knowledge sharing platform. Further, during an implementation phase of the AI action, a configured AI action can be further refined and/or defined (e.g., by an editor) to be executed within a particular context. For purposes of illustration, the book website may modify and/or customize an AI template through a configuration phase to perform a corresponding action using artificial intelligence generally within the operations of the book website. The configured AI action may be further defined during an implementation phase of the AI action that is executed using artificial intelligence within a specific context, such as to generate and/or transform particular content, wherein the context is to edit a specific field (e.g., bio field) of a particular author. The various states of an AI action (e.g., generic template, configured AI action, defined AI action for a particular context, results of executing a defined AI action, etc.) may be stored in output storage 425.

During a configuration phase of an AI action, the AI action platform 300 works cooperatively with CMS 100 to configure a corresponding AI action template as a configured AI action, and that is made available to users (e.g., editors) of that organization for use within a specific context.

The AI action platform 300 includes a content management system (CMS) 100, that is a headless CMS configured to enable creation or editing of content that is accessible over the internet. As previously described, the CMS is a system that facilitates and manages the creation, storage, editing and delivery of digital content. Further, CMS 100 is able to utilize AI actions to automate actions and/or functions that are performed during the transformation and generation of AI driven content. More particularly, CMS 100 includes a content platform 102 that is configured to unify and structure content for improved content management and delivery, as previously described. Also, CMS 100 includes a content management application programming interface (API) 104 for mediating the creation, editing, federation and other management of content. Briefly, an API includes communication protocols and subroutines to enable communication (e.g., via API calls) between applications and/or components utilizing those applications. For example, the content management API 104 enables for programmatic creation and/or updating of content items. As such, the content management API 104 can be used for the creation and editing of content in the CMS 100, creation and editing of workflows 315, creation and editing of AI action templates 435, automatic import of data from other content sources/repositories, integration with other back-end systems (e.g., e-commerce shop), building custom editing experiences, managing output storage 420, etc.

In addition, the AI action platform 300 includes a server side workflow manager 310 configured to generate and modify a plurality of workflows, wherein each workflow is configured to interact with the cloud data via the CMS. That is, the server side workflow manager 310 may implement workflow management APIs for the creation and sourcing and federation of a plurality of workflows 315. In particular, the server side workflow manager utilizes a workflow management API to enable access to, generation of, and/or editing of workflows, such as via API calls. The server side workflow manager 310 may work cooperatively with the AI actions service 330 for integrating and/or modifying AI actions within a corresponding workflow, wherein AI actions service 330 is communicatively coupled with the CMS platform 102 and/or block 302 for the creation, sourcing, modification, implementation, and/or federation of AI action templates 435. That is, workflow manager 310 in cooperation with the AI actions service 330 may implement AI actions management APIs (e.g., via API calls) for the creation and sourcing and federation of a plurality of AI actions templates 435. In particular, the AI actions service 330 may implement the AI actions management APIs in cooperation with or at the direction of the workflow manager 310. In another embodiment, the workflow manager 310 may implement the AI actions management APIs (e.g., via API calls) directly for the creation and sourcing and federation of a plurality of AI actions templates 435. In still another embodiment, the AI actions service 330 may implement the AI actions management APIs directly (e.g., via API calls), and without input from the server side workflow manager 310, for the creation and sourcing and federation of a plurality of AI actions templates 435.

More particularly, the server side workflow manager 310 interfaces with a web workflow manager 340, that is executed on a client browser via user interface 341, to define a first workflow within the CMS, and/or AI action templates 435. In another embodiment, the web workflow manager 340 interfaces directly with the AI actions service 330 for the creation, sourcing, modification, and federation of AI action templates 435. In one embodiment, the web workflow manager may be included within or cooperate with the web editor 112 of FIG. 1. For example, an administrator of an organization, interfacing with the workflow manager 310 via user interface 341, may be generating a particular workflow (e.g., first workflow) that is particular to the needs of the organization, and wherein the workflow may be repeatedly used in different contexts (e.g., generating multiple author entries of a book website, wherein an entry includes a bio field for a corresponding author. In particular, the workflow includes one or more workflow steps that are configured for generating and editing first data (e.g., author entries) via the CMS.

In addition, the server side workflow manager 310 interfaces with the web workflow manager 340 to access a first workflow step in the first workflow. The first workflow step includes one or more actions to be performed. For example, when creating an author entry, a workflow step may be to translate a field (e.g., bio field) into multiple locales (e.g., languages, regions, etc.), wherein the translation may include various actions. In particular, a first action performed in the first workflow step can be automated, such as by configuring an AI action template to generate a configured AI action that can be further defined by an editor for a particular context (e.g., translate the bio of a particular author). For example, the server side workflow manager 310 interfaces with the web workflow manager 340 (i.e., as controlled by the administrator) to modify the first workflow step in the first workflow via the server side workflow manager 310 by configuring a first artificial intelligence (AI) action to be performed within the first workflow step. The first AI action may be later defined by an editor for use within a particular context when executing the workflow.

In particular, during configuration of the AI action, the server side workflow manager 310 interfaces with a web workflow manager 340 (i.e., as controlled by the administrator) to access the plurality of AI action templates 435 available within the CMS (e.g., via AI actions service 330), and to select a first AI action template from the plurality of AI action templates, wherein the first AI action template corresponds with the first AI action. The first AI action template includes an instruction or prompt that can be further configured. For example, one or more variables of the prompt of the first AI action template are configured to generate and/or configured the first AI action to be utilized within the first workflow step of the first workflow. In that manner, a plurality of AI action templates 435 can be generated, created, sourced, and federated within CMS 100. Additionally, the AI actions service 330 may interface with the web workflow manager 340 directly to configure one or more AI action templates, such as when AI actions are used independent of any workflow.

A variable may be any parameter that can be further narrowed to a value, to help define a particular context within which the prompt is run and/or executed. For purposes of illustration, such as within a content generation scenario, a variable may be taken from a group consisting of: an entry; bulk entries; a field; an internal reference; an external reference; text; an image; multiple choice of a plurality of options; a locale; an exclusion; and media.

As a result, the AI action configuration provides for advanced prompt control and variable driven execution. In particular, users (e.g., administrators) can create AI actions from scratch or leverage pre-built templates (e.g., those built by Contentful GMBH, other content management system providers, or other users, etc.). These users can fine-tune prompts and/or instructions to suit a particular need of an organization, wherein the prompt and/or instruction can be further defined (e.g., set values for each variable) to optimize AI-generated output for a particular context. In that manner, the AI action platform 300 supports advanced variables that provide context upon runtime, to further improve the quality of output towards the needs of a user (e.g., editor of an organization). Further, prompts can be tested against real-world content before full deployment, minimizing errors and inconsistencies In addition, AI action configuration provides for model configuration and extensible model integration. In particular, administrators can configure specific model parameters for invocation, thus controlling the degree of creativity that an editor has when implementing a corresponding AI action that has been previously configured. Also, an administrator configuring AI actions can utilize bring-your-own-key (BYOK) for standard model providers that are available through the AI action platform 300. This allows content creators or other businesses to run corresponding AI actions (that have been further defined) using established connections and/or contracts with their AI model providers (e.g., third party model providers). In addition, an administrator configuring AI actions through the AI action platform 300 can utilize customized or private AI models.

Further, AI action configuration provides for platform integration. In particular, users (e.g., administrators and/or editors) can define different AI Action execution modes, including manual triggering, bulk processing, and/or integrated as part of an automation process (e.g., within a step of a workflow). Also, users can control which entities (e.g., internal or external content) an AI action is applied to, refining AI behavior at a granular level. Further, the AI action platform and the use of AI actions can be integrated within the CMS 100, including providing AI action functionality to editing functionality and/or workflow functionality provided by CMS 100. In other embodiments, bulk AI processing and workflow based execution using AI actions enhance efficiency and scalability.

Also users (e.g., administrators and/or editors) can select from different deep/machine learning engines provided by the AI action platform 300 of the CMS 100. In one embodiment, the deep/machine learning engines are configured as large language models (LLMs) that are designed for performing natural language processing. For example, LLMs may be suitable for use by content management creators when generating content (e.g., author bios of a book website, etc.). Purely for illustration, the deep/machine learning engine may be configured as a neural network used to train and/or implement an AI model (e.g., LLM). Generally, the neural network represents a network of interconnected nodes responding to input (e.g., extracted features) and generating an output. In particular, the AI model is configured to apply rules defining relationships between features and outputs, wherein features may be defined within one or more nodes that are located at one or more hierarchical levels of the AI model. The rules link features (as defined by the nodes) between the layers of the hierarchy, such that a given input set of data leads to a particular output of the AI model 170. For example, a rule may link (e.g., using relationship parameters including weights) one or more features or nodes throughout the AI model (e.g., in the hierarchical levels) between an input and an output, such that one or more features make a rule that is learned through training of the AI model. That is, each feature may be linked with one or more features at other layers, wherein one or more relationship parameters (e.g., weights) define interconnections between features at other layers of the AI model. As such, each rule or set of rules corresponds to a classified output.

During an implementation phase of an AI action, the AI action platform 300 works cooperatively with CMS 100 to allow for defining a corresponding AI action for execution within a specific context, that has been configured, such as within a workflow made available to users (e.g., editors) of that organization. In particular, CMS 100 is configured to enable creation or editing of content via an AI action that has been configured and defined for a particular context.

The AI action platform 300 includes a server side workflow editor 355 configured to instantiate the plurality of workflows, wherein each workflow is configured to interact with cloud data via the CMS 100. That is, the server side workflow editor may implement workflow editing APIs for the creation and sourcing and federation of the plurality of workflows 315. In particular, the server side workflow editor 355 utilizes a workflow editing API to enable access to, generation of, editing of workflows, and/or implementation of workflows, such as via API calls.

In particular, the server side workflow editor 355 interfaces with a web workflow editor 350 executed on a second client browser presented on user interface 351 to instantiate a first workflow during an implementation phase. In one embodiment, the web workflow editor may be included within or cooperate with the web editor 112 of FIG. 1. For example, the first workflow may be performed to generate an author entry (e.g., including an author bio) for a book website. More specifically, the server side workflow editor 355 interacts with the workflow processing engine 320 that is configured for creating, managing, and/or implementing workflows. As an illustration, the workflow processing engine walks through the first workflow to guide a user (e.g., editor) to perform whatever task the workflow is designed to accomplish, such as generate an author entry.

Also, the server side workflow editor 355 works cooperatively with the AI actions service 330 for integrating, defining, and/or modifying AI actions within a corresponding workflow to be executed within a particular context. In particular, the AI actions service 330 interfaces with the web workflow editor 350 (e.g., as controlled by an editor via user interface 351) to invoke the first AI action in the first workflow step, such as when performing the first action in the first workflow step. In particular, AI actions service 330 is communicatively coupled with the CMS platform 102 and/or block 302 for the creation, sourcing, modification, implementation, and/or federation of AI action templates 435. Specifically, the first AI action includes a prompt that has been configured with one or more variables (e.g., during a configuration phase of the AI action). In addition, during the implementation phase of the AI action, the AI actions service 330 interfaces with the web workflow editor 350 to define one or more values for the one or more variables. The defined and resolved values for the variables sets and/or defines a context within which the prompt is executed.

In one embodiment, AI actions can be triggered independently of any workflow. In particular, AI actions service 330 interfaces with the web AI action editor 353 (e.g., as controlled by an editor via user interface 351) to invoke an AI action, wherein the invocation can be performed independent of a workflow. In one embodiment, the web AI action editor 353 may be included within or cooperate with the web editor 112 of FIG. 1. As previously described, the AI actions service 330 may implement AI actions APIs for the generation of, editing of AI actions or AI action templates, and/or implementation of AI actions and/or AI action templates. For example, AI actions service 330 communicates with AI actions processing engine 430 for the invocation and execution of AI actions. As such, the AI actions service 330 is configured for defining and/or modifying a first AI action to be executed within a particular context. That is, the first AI action includes a prompt that has been configured with one or more variables (e.g., during a configuration phase of the AI action). In addition, during the implementation phase of the first AI action, the AI actions service 330 interfaces with the web AI actions editor 353 to define one or more values for the one or more variables. The defined and resolved values for the variables sets and/or defines a context within which the prompt is executed.

Whether invoked using the web workflow manager 340 or the web AI action editor 353, the AI actions service 330 resolves the one or more variables of the prompt with the one or more values that are defined (e.g., by the editor). In that manner, the AI actions processing engine 430 is able to construct the prompt with the one or more variables that are resolved, and send the prompt that is constructed to a configured AI model, such as an LLM (e.g., internal to CMS 100, external to CMS, proprietary or private, third party, etc.) (not shown) for execution. In one embodiment, the LLM is configured within the prompt, during the configuration of the AI action.

More particularly, after constructing the prompt, the AI actions service 330 sends the prompt and/or instruction of the corresponding AI action to the asynchronous processing engine (e.g., scheduler) 410. The engine 410 schedules the constructed prompt for execution. At the appropriate time, the asynchronous processing engine sends the prompt to the AI actions processing engine 430 for execution of the constructed prompt, wherein the processing engine may send the prompt to a configured AI model (e.g., LLM) for execution. Further, the AI actions processing engine 430 receives from the LLM a result of execution of the prompt, and incorporates the result into the first data. In one case, the result may be stored in output storage 420.

Figure 4A:
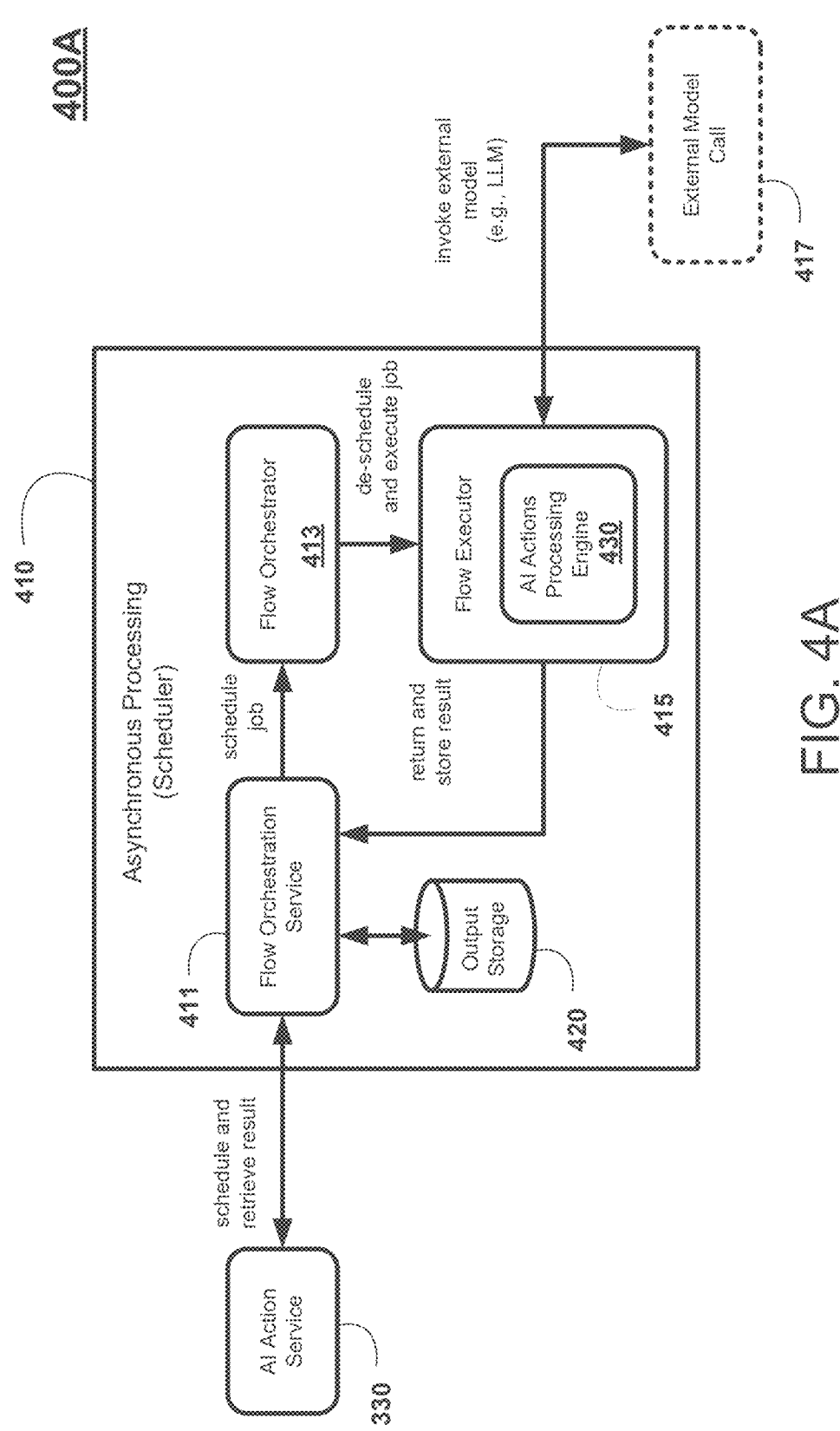
FIG. 4A illustrates an operational flow for scheduling execution of one or more AI actions, in accordance with one embodiment of the present disclosure.

FIG. 4A illustrates an operational flow 400A for scheduling and executing of one or more AI actions, in accordance with one embodiment of the present disclosure. Operational flow may be integrated within and/or implemented by one or more of the previously described components of AI action platform 300, and CMS 100 described in FIGS. 1-3.

Operational flow 400A includes system operations for implementing a workflow and/or AI actions within a workflow. In particular, the AI action service 330 works cooperatively with the asynchronous processing engine 410 (e.g., scheduler) to perform the operations shown in operational flow 400A. A brief overview of the operations in operational flow 400A include: requesting an AI action for execution (e.g., within a workflow); compiling the AI action prompt and submission of the job to execute the AI action; scheduling the job; processing the job through AI model invocation to generate a result; storing the result; and providing access to the result.

In a first operation of operational flow 400A, a user (e.g., editor) requests an AI action, that has been configured, via the AI action service 330 using an AI action API (e.g., via an API call), such as when making a content transformation request to be performed automatically by the AI action. In a second operation of operational flow 400A, the AI action service 330 compiles the prompt, applies and resolves variables, through the definition of values for the variables. In particular, a prompt is constructed with the resolved variables (e.g., with defined values).

The AI action service 330 is the primary entry point for users to interact with the system (e.g., AI action platform 300 implementing the operational flow 400A). The AI action service 330 provides a public API (e.g., via API calls) that can handle CRUD operations for AI actions, such as creating, updating, retrieving, and deleting AI actions. The public API can be utilized for the invocation of AI actions, such as by dynamically compiling AI prompts based on user-defined instructions and provided variables (e.g., values for variables). Also, the public API can be utilized for asynchronous job submission by forwarding the compiled AI action to the flow orchestration service 411 for execution. In particular, the AI action service 330 exposes API endpoints (e.g., API calls) for managing AI actions; parses and validates user-defined AI actions; constructs the execution payload using predefined prompts, models, and variables; and sends the compiled AI action to the Flow Orchestration Service for job execution.

As shown, the AI action service 330 submits the job to execute the defined AI action using the constructed prompt to the asynchronous processing engine 410 (e.g., scheduler), including the flow orchestration service. In particular, the job to execute the defined AI action asynchronously is submitted to the flow orchestration service 411.

The flow orchestration service 411 is an internal service responsible for managing asynchronous job execution. Flow orchestration service 411 acts as an intermediary between the AI action service 330 and the flow orchestration system (i.e., flow orchestrator 413) to ensure efficient job scheduling, execution, and retrieval of results. In particular, the flow orchestration service 411 performs job management, to include handling scheduling, cancellation, status tracking, and retrieval of AI action execution results. Also, the flow orchestration service 411 interacts with the flow orchestration system (i.e., flow orchestrator 413) to queue jobs based on priority, concurrency, and rate limits. Further, the flow orchestration service 411 performs result retrieval and storage, wherein once a job is executed by the flow execution system (i.e., flow executor 415), the flow orchestration service 411 stores the output and makes it available for retrieval by a user (e.g., customer, administrator, editor, end user, etc.).

In a third operation of operational flow 400A, the flow orchestration service schedules the job in the flow orchestrator 413 (also referred to as the flow orchestration system), which is configured to manage job execution, such as by assigning priority of execution, monitoring and enforcing rate limits, and applying concurrency control. When scheduled, the flow orchestrator 413 sends the job to the flow executor 415 for execution.

The flow orchestrator 413 is responsible for managing and optimizing job execution workflows. The flow orchestrator 413 provides advanced control over job queues, priority management, rate limiting, and concurrency handling to ensure the efficient execution of AI actions. In particular, the flow orchestrator 413 performs job queue management, including managing incoming AI action jobs, and organizing the jobs in prioritized execution queues. Further, the flow orchestrator 413 performs concurrency control by ensuring that AI model invocations are executed within defined concurrency limits to prevent overload. Also, the flow orchestrator 413 performs rate limiting and throttling, by regulating the frequency of AI action executions to comply with system and external API limitations. Further, the flow orchestrator 413 performs execution coordination by assigning jobs to the flow executor 415 via flow execution containers based on priority and available resources.

In a fourth operation of operational flow 400A, the flow executor 415, also referred to as the flow execution system, processes the job by invoking the designated and configured AI model (LLM) to generate the output. As shown, the flow executor 415 includes the AI actions processing engine 430 that is configured for executing a prompt including resolved variables, that further constitutes the job. That is, a call is made to an AI model (e.g., external model call) to execute the prompt including resolved variables, and provide an output result back to the AI actions processing engine 430 and/or the flow executor 415.

In particular, the flow executor 415 consists of a set of containerized execution environments responsible for invoking external AI models and processing AI action jobs. Each container is dynamically provisioned based on workload demand and system constraints. The flow executor 415 is configured to perform job execution by processing AI actions through the invocation of an appropriate AI model (e.g., LLM) that may be an internally located AI model, proprietary AI model, contracted AI model, externally located AI model, etc. The flow executor 415 performs model invocation, by supporting multiple AI model integrations (e.g., CMS AI model, proprietary AI models, third party AI models, contracted AI models, etc.). The flow executor 415 performs result storage and retrieval by storing generated outputs in the flow orchestration service 411 for later retrieval by the user. The flow executor 415 also ensures scalability by implementing serverless execution environments that can scale based on system demand.

In a fifth operation of operational flow 400A, the result (e.g., generated content) of the execution of the prompt is sent to and stored by the flow executor 415 (or flow orchestration service) for retrieval. For example, the output result is stored in the output storage 420, previously introduced. Also, in a sixth operation of operational flow 400A, users (e.g., editors of an organization, and end users of the organization utilizing the CMS, etc.) are able retrieve the result via the AI action service 330, such as via API calls made to the flow orchestration service 411.

Figure 4B:
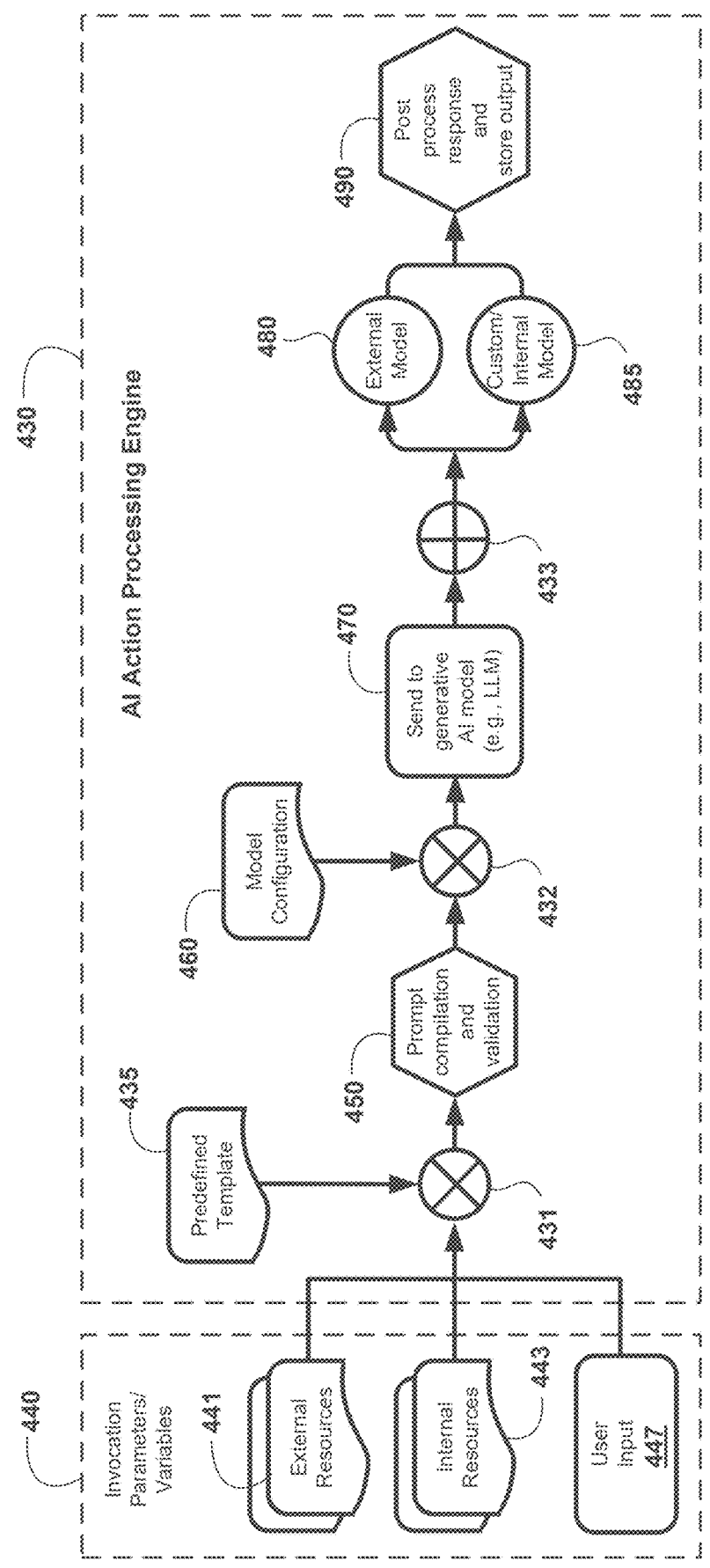
FIG. 4B illustrates an operational flow for executing an AI action, in accordance with one embodiment of the present disclosure.

FIG. 4B illustrates an operational flow 400B for executing an AI action, in accordance with one embodiment of the present disclosure. Operational flow 400B may be integrated within and/or implemented by one or more of the previously described components of AI action platform 300, and CMS 100 described in FIGS. 1-3. In addition, operational flow 400B may be integrated within or operate in conjunction with operational flow 400A of FIG. 4A.

In one embodiment, the AI action platform 300 is built using modern cloud-native technologies and a microservices architecture for containerized service deployment to ensure scalability, flexibility, and reliability. In that manner, the AI actions platform 300 is configured to process and manage various types of data, including user-defined AI actions, execution flows, generated outputs, and metadata related to AI-driven content generation. Data storage implementations ensure efficient state management, data persistence, scalability, security, and compliance. For example, different storage solutions may be implemented to enable structured and unstructured data storage, with a focus on encryption, auto-deletion policies, and audit logging.

Operational flow 400B includes system operations for implementing core functionalities for executing an AI action. In particular, resolving invocation parameters and variables and compilation of an AI action template (e.g., as a configured AI action that has been defined with values for variables) are performed in operations shown in operation 440. Resolving invocation parameters and variables and compilation of an AI action template may be performed by an AI action service 330, previously described. Also, AI model invocation operations are performed by AI action processing engine 430, which may also compile and validate the AI action template.

Operational flow 400B may include the following operations, including the generation and configuration of an AI action; invocation of an AI action, which passes external, internal, or user-provided input variables; having the AI action service resolve variables and compile the instruction template; sending the compiled instruction and model configuration to the flow execution system; having the flow execution system invoke the AI model to generate a response; and storing the generated output.

In particular, before an AI action is executed, the AI action platform 300, implementing operational flow 400B, processes all invocation parameters to ensure correctness, consistency, and completeness. These parameters define the contextual data required for generating AI-driven content generation and/or transformation. For example, the parameters can be previously described variables and their defined values. These parameters can originate from various sources, such as external references 441, internal references 443, and user input 447. These parameters are sent to the AI action processing engine 430 for instruction (e.g., prompt) AI action template compilation and execution.

The parameters are resolved, such that values are defined for each variable. For example, external and internal references are resolved. In particular, API-based references may be fetched from external sources (e.g., via API calls). That is, a resolved parameter may originate from or point to external references 441, and include data retrieved via third-party APIs (e.g., API calls), such as external knowledge bases, customer relations management (CRM) data, or user-provided API inputs. Also, internal references may be fetched and/or retrieved from internal entities utilizing the CMS 100, or other internal data points within CMS 100. That is, a resolved parameter may originate from or point to internal references 443, and include content pulled from an entity utilizing CMS 100 (e.g., as managed by Contentful GMBH, etc.) for storing data entries, structured data, or other internal content management sources. Further, user provided variables are extracted and assigned to the correct placeholders. That is, a resolved parameter may originate from user input 447, including dynamic variables supplied by users at runtime to fine-tune content generation. Thereafter, resolved parameters are sent to the AI action processing engine 430 for instruction (e.g., prompt) AI action template compilation and execution.

In particular, AI action processing engine 430 validates parameters. For example, the resolved parameters and the predefined AI action template 435 corresponding with those parameters (e.g., performs a specific AI action) are combined at operation 431, and sent to operation 450 to perform prompt compilation and validation. In particular, the integrity and completeness of the input parameters are verified for validation. Also, type checks, format validation, and schema enforcement are performed to prevent errors during the validation of the parameters.

Further, operation 450 performs instruction template compilation. That is, the predefined AI action template 435 is compiled using the parameters that are resolved and validated. In particular, the AI action template is compiled by injecting the invocation parameters into predefined instructions (i.e., prompts). As such, the AI action instruction template is dynamically assembled and compiled using the resolved and validated parameters. As such, a contextualized prompt is compiled.

Once the final, compiled AI action template is generated, the contextualized prompt is ready for execution by an AI model (e.g., LLM) through an AI model invocation. In particular, operation 460 is performed to configure the AI model, such that the AI model is identified. In one embodiment, the AI model has been configured within the prompt during configuration of the AI action (e.g., by an administrator). As such, the configured AI model and the compiled and validated prompt are combined at operation 432, such that the compiled AI action template 435 and model configuration 460 are sent to the Model Invocation Engine.

That is, after the AI action template 435 is compiled, it is sent to the model invocation engine (e.g., the AI action processing engine 430) along with the necessary AI model configurations. The model invocation engine is responsible for processing AI requests by interacting with external AI models while ensuring the correct settings are applied. In particular, the AI model invocation request is prepared by packaging the compiled instruction template 435 with model specific configurations (e.g., for a particular AI model). The configuration parameters include a 'target model selection' that identifies the specific AI model to be used (e.g., OpenAI GPT, Anthropic's Claude, internal fine-tuned models, small language models, etc.). In addition, the configuration parameters include model hyperparameters, such as adjustments such as temperature (controls randomness), max tokens, and other fine-tuning parameters At operation 470, the compiled and validated prompt is delivered to the configured AI model in order to execute the AI model invocation using the appropriate external model or proprietary AI service. For example, the flow execution system or flow executor 415 and/or the AI actions processing engine 430 may invoke the appropriate AI model via a corresponding API (e.g., API call). In one embodiment, the request is handled asynchronously to optimize resource allocation and high scalability use cases. In particular, at operation 433, the location of the AI model is determined. For example, operation 433 may determine that the AI model is an external model 470, or may determine that the AI model is an internal AI model 485 (e.g., custom to the CMS 100).

Thereafter, the operation 490 is performed for post processing and storage of the response. In particular, the appropriate AI model processes the request and generates a response (e.g., content). The generated response is validated for format and completeness before being sent for storage, as previously described. As such, once the AI-generated output or response is received, the response is stored in the AI action platform 300 for retrieval and further processing. This ensures users can access, refine, and utilize the AI-generated content efficiently. In one embodiment, the data is stored in a third party cloud data storage system for long-term persistence. A reference to the output or response in the storage system is saved, and placed into a referential database, allowing for easy lookup and retrieval.

In particular, the result and/or output is associated with the execution of the corresponding AI action. In particular, the flow orchestration service 411 updates the job status to reflect completion. Also, the stored output in the storage system is linked back to the original AI action execution request (e.g., job) in order to associate the result with the request (e.g., job). For example, a detailed log of AI action execution flows are generated to support audit logging and traceability. Each execution flow consists of an invocation identifier that links the execution instance to a stored AI action; execution metadata which contains the timestamp, user ID, and input parameters used; a job status which tracks whether the execution is pending, running, completed, or failed; a model invocation log which stores information about which model was used and its response time; and error logs, which captures failures, rate limits, or API errors during execution.

Further, once an AI action is executed, the generated output (e.g., AI-generated text, structured response or media response (e.g. image)) is stored for retrieval and further processing. Access controls may be provided, wherein only authorized users can retrieve the output. An auto-delete policy may be implemented where results may be stored temporarily and automatically deleted after a pre-configured retention period to ensure cost efficiency and minimize unnecessary data retention.

Moreover, the stored result and/or output can be accessed for further processing. In particular, users (e.g., editors) can retrieve, review, and modify the AI-generated content. Additional processes may be performed on the stored result and/or output. For example, post-processing steps may be applied, such as, filtering, formatting, or workflow-based automation. Further, a user can control the output format, e.g. alternating between plain text, markdown or custom CMS rich text format.

FIG. 5A illustrates a user interface 500A presenting a dashboard of a plurality of AI action templates that can be configured for customized use in workflows or for direct implementation, in accordance with one embodiment of the present disclosure. That is, these AI action templates are predefined and ready for configuration and compilation. As previously described, each AI action template corresponds to a particular action or function that can be performed using artificial intelligence. That is, an AI action template can be customized into an AI action that can be configured using variables, such as by an administrator. Also, the configured AI action is available to users (e.g., editor) for desired use within a particular context by defining values for the variables to generate a compiled AI action that can be executed by a corresponding and configured AI model. The AI action templates can be created by Contentful GMBH or other content management system providers, or may be contributed by users (e.g., individuals, groups, organizations, etc.) of a content management system implementing AI actions, or partners of those users, thereby allowing for sharing of knowledge in order to resolve a wide range of use cases encountered during lifecycles of generated content. The AI action templates can be used within the AI action platform 300 and CMS 100 of FIGS. 1-3 for configuration and compilation of AI actions, such as when used in a workflow or in isolation to generate and/or transform content As shown, a plurality of AI action templates are presented in a dashboard configuration. However, it is understood that the plurality of AI action templates may be accessed through or presented in other formats, such as a list, or scroll, or scrolling through pages of AI action templates, etc. For example, the dashboard may include twenty templates, but can include any number of templates. That is, AI action templates that are newly built can be dynamically added to the dashboard, and AI action templates can also be removed dynamically. Purely for purposes of illustration, in the dashboard shown in user interface 500A AI action template 501 is an empty template that can be configured to include a newly published AI action template. AI action template 502 can be configured and/or compiled to perform a 'translation' action automatically using artificial intelligence, such that the translation action can be automatically performed to convert text to another language. AI action template 503 can be configured and/or compiled to perform a 'rewrite' action automatically using artificial intelligence, such that the rewrite action can be automatically performed to rephrase text with the same meaning. AI action template 504 can be configured and/or compiled to perform a 'spelling and grammar checker' action automatically using artificial intelligence, such that the spelling and grammar checker action can be automatically performed to check fields or entries for spelling and grammar improvements. AI action template 505 can be configured and/or compiled to perform a 'search engine optimization (SEO) keyword optimization' action automatically using artificial intelligence, such that the SEO keyword optimization action can be automatically performed to rewrite content to optimize for keyword usage and SEO best practices. AI action template 506 can be configured and/or compiled to perform an 'alt-text generation' action automatically using artificial intelligence, such that the alt-text generation action automatically generates accurate and descriptive alternative text for corresponding media (e.g., image). AI action template 507 can be configured and/or compiled to perform a 'generate question and answer (Q&A)' action automatically using artificial intelligence, such that the generate Q&A action can be automatically performed to use existing content in a project space of the CMS to produce a set of FAQs. AI action template 508 can be configured and/or compiled to perform a 'generate blog post on topic' action automatically using artificial intelligence, such that the generate blog post on topic action can be automatically performed to create a blog post about an existing topic, such as in a project space of the CMS. AI action template 509 can be configured and/or compiled to perform a 'create how-to guide' action automatically using artificial intelligence, such that the create how-to guide action can be automatically performed to create a help article, such as from existing content.

Figure 5B:
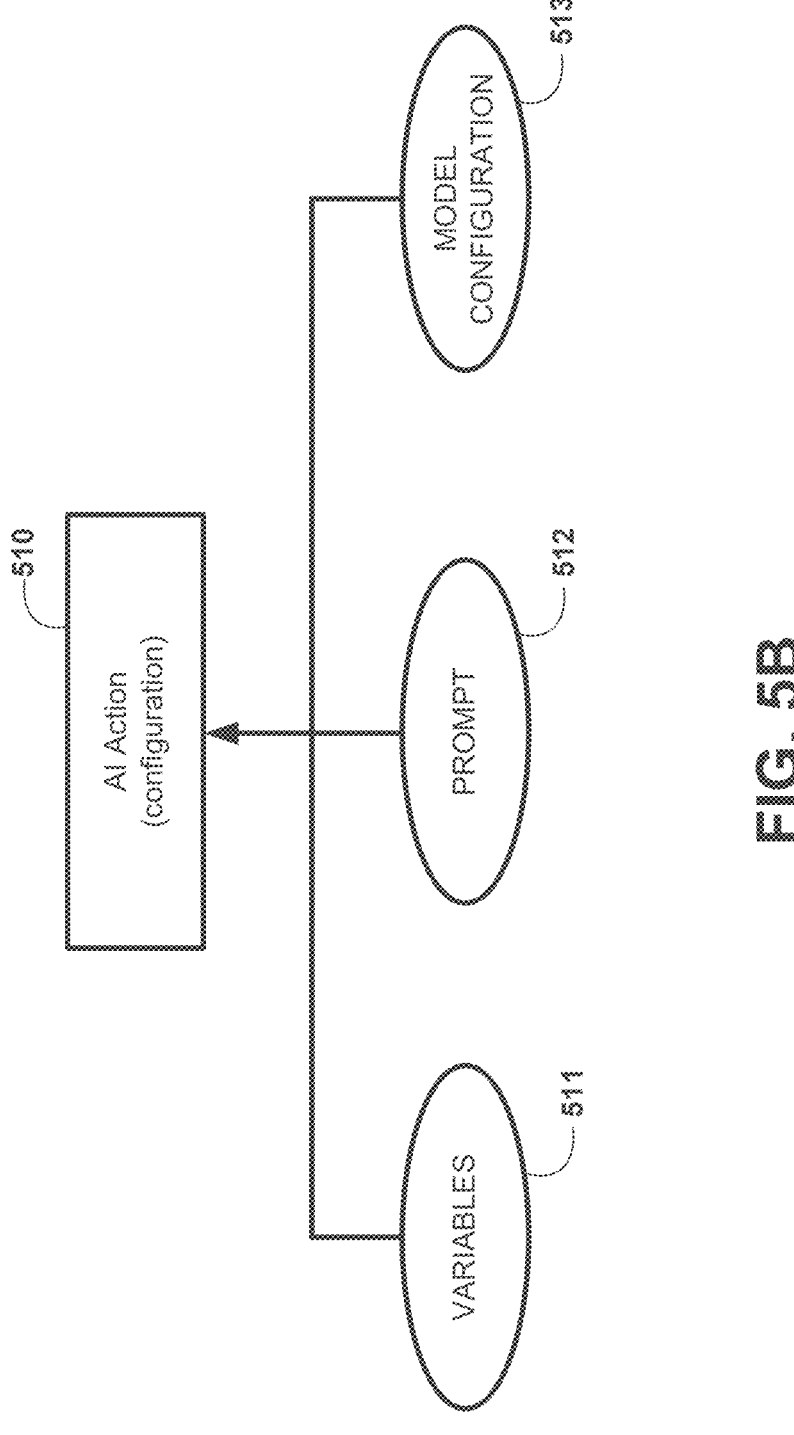
FIG. 5B illustrates components of an AI action, in accordance with one embodiment of the present disclosure.

FIG. 5B illustrates components of an AI action, in accordance with one embodiment of the present disclosure. The AI action can be used within the AI action platform 300 and CMS 100 of FIGS. 1-3 for configuration and compilation of AI actions, such as when used in a workflow or in isolation to generate and/or transform content.

Each AI Action 520 consists of three key properties that define how the AI model should be invoked and customized. In particular, the AI action may be configured (e.g., using a corresponding AI action template) for use within an organization utilizing CMS services, and the configured AI action may be further compiled by defining values for each of the variables included within a configured prompt of the configured AI action template (i.e., configured AI action). The compiled AI action defines a context within which the prompt is executed by a corresponding and configured AI model.

In particular, the variables 511 provide invocation parameters, as previously described. For example, the variables may include external resources that refer to data retrieved from third-party services via APIs (e.g., API calls), or internal resources that refer to content pulled from within the CMS 100 platform (e.g. linked entities), or user input to include direct user provided inputs such as free-text or pre-defined selections (e.g., extensions).

Further, these variables dynamically populate placeholders in the AI instruction template 512 (e.g., prompt) to define a context from which the prompt may be executed by the corresponding AI model, thereby ensuring contextual relevance for the prompt. In particular, the instruction template includes the instruction text (prompt) that is sent to the corresponding AI model. Further, the instruction template may reference variables within the instruction template, wherein contextual data (i.e., values for variables) is inserted at invocation or run time.

Also, model configuration 513 of an AI action 510 specifies the AI model to be referenced and used to execute the prompt of the AI instruction template that has been configured and/or compiled. In particular, the model configuration includes model specific parameters, such as temperature that controls the randomness of generated output. Also, the model configuration includes maximum tokens, which limits the response length. Further, the model configuration may include other hyperparameters relevant to the selected AI model.

Figure 5C:
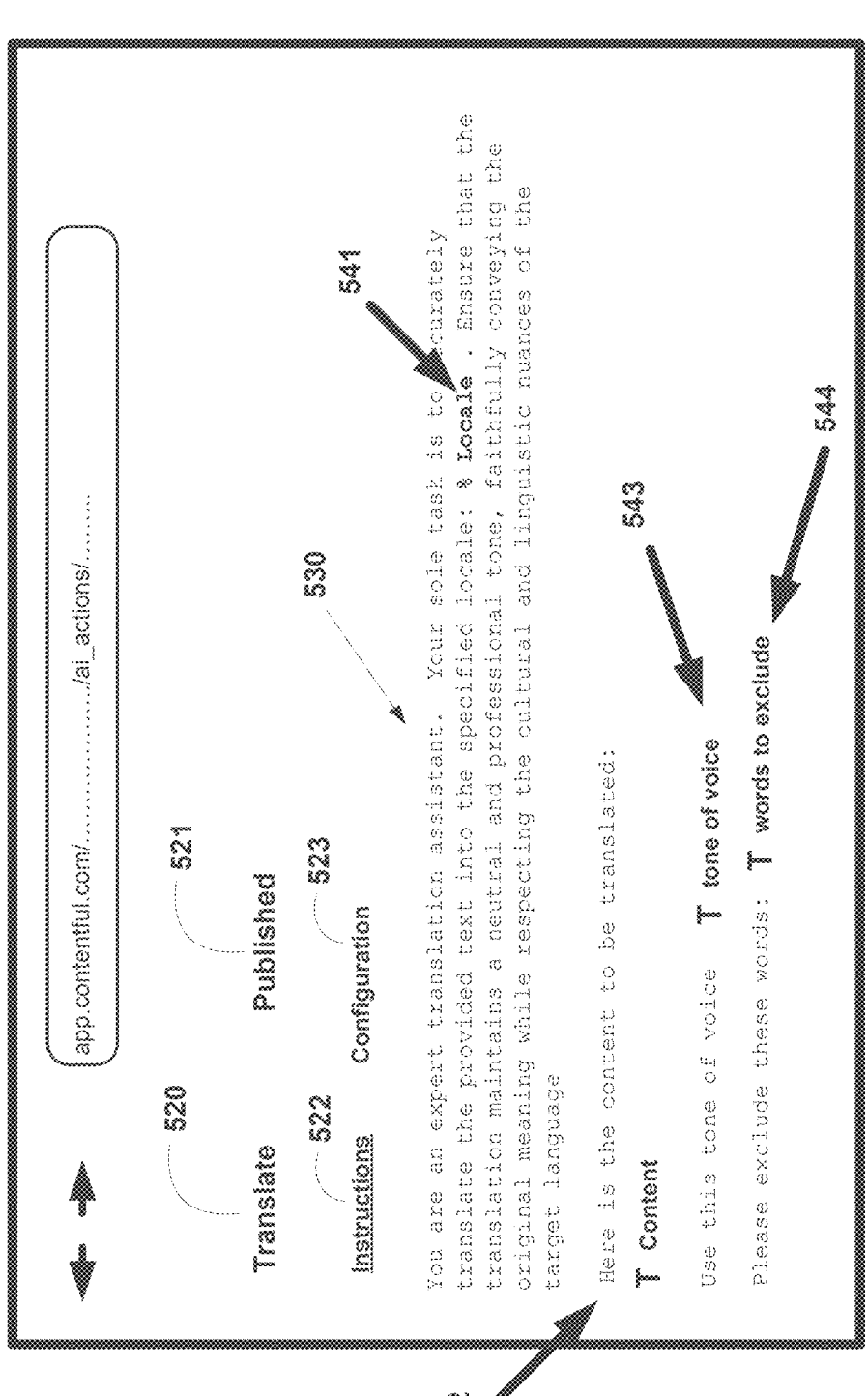
FIG. 5C illustrates a user interface providing for interaction with an exemplary prompt instruction of a corresponding AI action, in accordance with one embodiment of the present disclosure.

FIG. 5C illustrates a user interface 500C providing for interaction with an exemplary prompt instruction of a corresponding AI action, such as when presented within an AI action template, in accordance with one embodiment of the present disclosure. The AI action that can be configured and compiled can be used within the AI action platform 300 and CMS 100 of FIGS. 1-3 for configuration and compilation of AI actions, such as when used in a workflow or in isolation to generate and/or transform content.

The user interface may be accessing the AI actions platform 300 over a network to configure and/or compile an AI action. In particular, the AI action template shown in user interface 500C performs a translation action 520. The AI action template for translation is published 521 and ready for use, such as by editors of an organization. For example, the AI action template may be accessed by selecting AI action template 502 in the dashboard presented in user interface 500A of FIG. 5A. The instruction 522 is selected to expose the underlying instruction and/or prompt 530 that can be configured and/or compiled (e.g., with values set for variables). The configuration 523 selection may be selected to configure and/or compile the AI action template for a particular context.

In particular, the prompt 530 that is exposed includes text that is delivered to a corresponding AI model to perform an action using artificial intelligence. One or more variables are presented within the prompt 530, wherein the variables are included within the prompt during a configuration phase. A variable may include one or more extensions that define values for that variable, or provide for user input to define a value for that variable, or may be set to a value by the administrator.

For example, a 'locale' variable 541 is presented to allow for selection of one or more locales (e.g., languages, regions, etc.) to be available. A 'content' variable 542 is made available for defining which content is to be used for translating. For example, the user (e.g., editor) may further define the location of the content for the content variable when compiling the AI action. In addition, a 'tone of voice' variable 543 is presented to allow for selection and/or input of various tones of voices that reflect how the content is translated. For example, the tone of voice may include one or more extensions that are selected, including a 'friendly' extension, a 'professional' extension, etc. In addition, an 'exclusion' variable 544 is presented to allow for input of words that should be excluded when executing the AI action. For example, the author's name may be excluded from translation when translating a bio field for an author entry.

With the detailed description of FIGS. 1-3, flow diagram 600 of FIG. 6 discloses a method for integrating artificial intelligence into a workflow by configuring an AI action, during a configuration phase, that can be inserted into the workflow, in accordance with one embodiment of the present disclosure. In that manner, AI actions can be defined, controlled, and executed dynamically by leveraging prompt engineering, model selection, and variable-based customization in order to guide the use of AI on how to interact with content managed by the CMS. The operations performed in the flow diagram 600 may be implemented by one or more of the previously described components of CMS 100 and/or AI action platform 300 previously described in FIGS. 1-3.

In addition, FIGS. 7A-7F illustrate multiple user interfaces showing the customization of an AI action that is inserted into a workflow, as provided through the operations of flow diagram 600, in accordance with embodiments of the present disclosure.

At 610, the method includes providing access to a content management system (CMS) via a workflow manager that is executed on a client browser for accessing cloud data and functionality of the CMS. As previously described, the CMS is a system that facilitates and manages the creation, storage, editing and delivery of digital content. Further, the CMS is able to utilize AI actions to automate actions and/or functions that are performed during the transformation and generation of AI driven content and/or the generation and modifying of workflows. The workflow manager is configured to generate and modify a plurality of workflows configured to interact with the cloud data via the CMS. Further, the workflow manager may be a server side component, such as the server side workflow manager 310 of FIG. 3.

As previously described, a workflow may be a series of steps developed by an entity (e.g., organization, content creator, etc.) that are performed to accomplish a particular task. That is, a workflow can be generated to accomplish any task. Further, the workflow can be repeatedly used to perform the task under different contexts. For example, a workflow may be implemented many times to generate multiple author entries for a book website.

At 620, the method includes accessing a first workflow via the workflow manager during a workflow configuration phase. Configuration of the workflow defines the first workflow within the CMS, such that the CMS can be used to process and guide implementation of the workflow by a user. For example, the first workflow includes one or more workflow steps, that can be configured to generate and edit first data via the CMS. In one implementation, the first data that is accessed by the first workflow is defined within a content project space of the CMS. For example, the content project space may be a plurality of author entries for a book website.

Figures 7A, 7B:
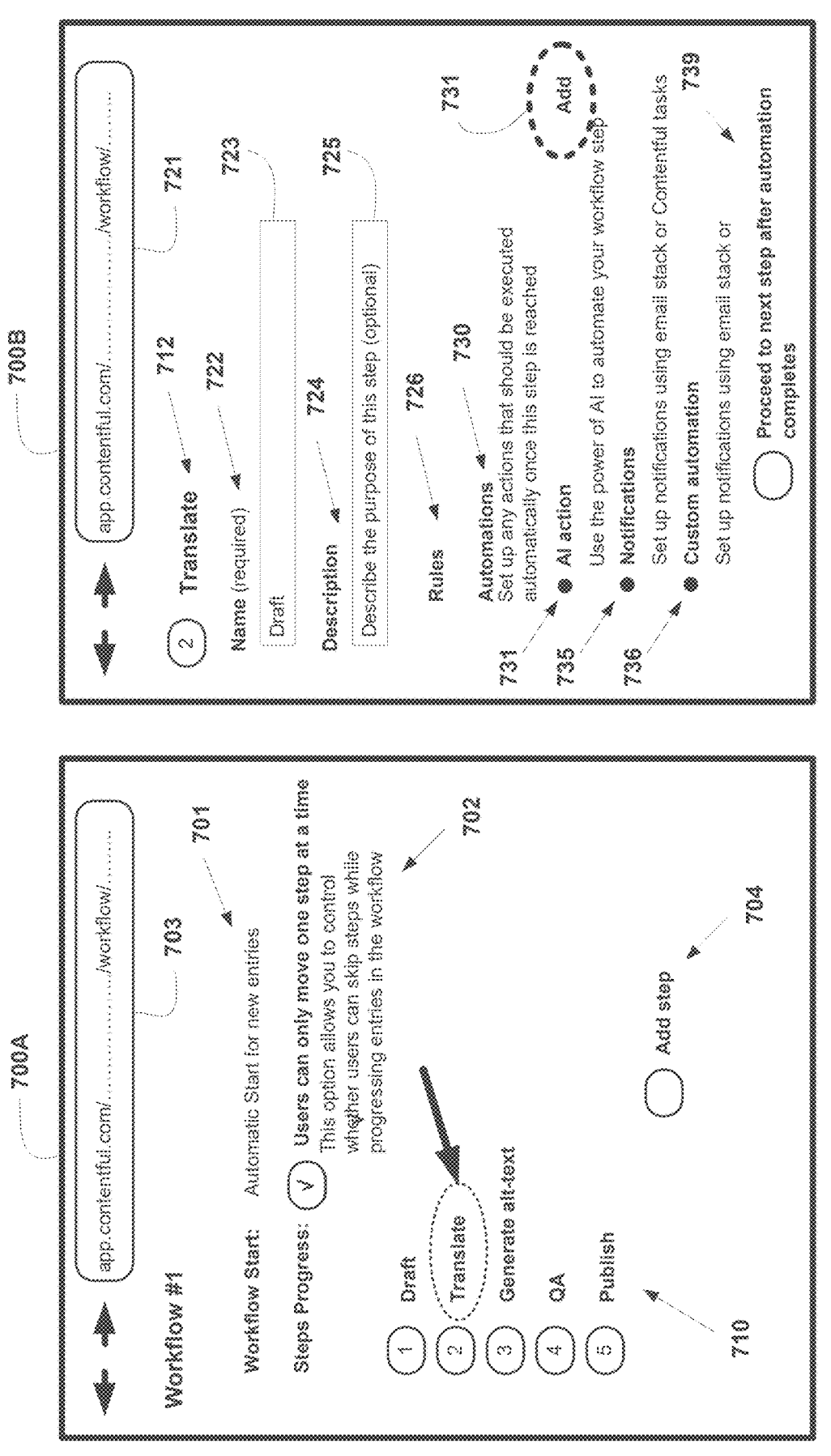
FIGS. 7A-7F illustrate multiple user interfaces showing the customization of an AI action that is inserted into a workflow, in accordance with embodiments of the present disclosure.

For illustration, FIG. 7A illustrates a user interface 700A that is accessed by an administrator to generate and/or modify a workflow, such as the first workflow or workflow #1. The user interface 700A provides access to the AI actions platform 300 for purposes of generating and/or modifying a workflow, as shown by the address bar 703. For example, the workflow may be used to generate an author entry for a book website. The steps progress 702 indicates whether the administrator creating the workflow would like the workflow steps to be performed in order, or whether workflow steps can be skipped so that steps can be performed in any order. The first workflow (or workflow #1) includes a plurality of workflow steps 710. Purely for illustration, there may be five workflow steps, including: a 'draft' step 1 used to draft content, such as the different fields in the author entry; a 'translate' step 2 used to translate a portion of the content; a 'generate alt-text' step 3 used to generate text for media, such as an image; a 'Q&A' step 4 for generating FAQs, and a 'publish' step 5 for making the workflow #1 available for use. During configuration of the workflow, one or more steps may be added, using the radio button 704. As shown, the 'translate' step 2 can be selected for automation using an appropriate AI action.

At 630, the method includes accessing a first workflow step in the first workflow via the workflow manager, wherein the first workflow step includes one or more actions to be performed, wherein a first action performed in the first workflow step can be automated.

For example, FIG. 7B illustrates a user interface 700B that is accessed by the administrator to access the 'translate' workflow step 2 (712) of the first workflow (e.g., workflow #1). The translate workflow step 712 may be selected via the user interface 700A of FIG. 1. The user interface 700B provides access to the AI actions platform 300 for purposes of generating and/or modifying the workflow step, as shown by the address bar 721. During configuration of the workflow step 712, a name 722 for the step is required, and may be provided through user input in block 723. Further, during configuration of the workflow step 712, a description 724 of the step is requested, and may be provided through user input in block 725. For example, the description may include wording, such as "convert text to another language". Various rules 726 may be defined for the workflow step.

In addition, one or more automations 730 may be performed for the various actions of the workflow step 712. As previously described, a workflow step may include one or more actions to be performed, wherein one or more of those actions may be automated using corresponding AI actions. For example, an action may be identified to be performed automatically using an AI action 731, which may be inserted into the workflow. Radio button 731 may be selected to add an AI action within the workflow step 712. In addition, other actions may be automated, including a notification action 735, or performing a custom automation action 736, such as setting up a notification using an email stack. Further, radio button 739 maybe selected to enable the CMS that is implementing the first workflow to proceed automatically to the next workflow step.

At 640, the method includes modifying the first workflow step in the first workflow via the workflow manager by configuring a first artificial intelligence (AI) action to be performed within the first workflow step. Continuing with the example provided in FIGS. 7A-7F, an AI action may be configured to perform translation of content within the first workflow (workflow #1). For example, radio button 731 may be selected to add an AI action within the workflow step 712, as is described more fully in relation to FIGS. 7C-7E.

In particular, when modifying the first workflow to include an AI action (e.g., a translation AI action) for the first workflow step, a plurality of AI action templates are accessed for selection of the appropriate AI action template, such as the template used for configuring translation automation. A user interface may be used to access the plurality of AI action templates (e.g., the dashboard presented in user interface 500A of FIG. 5A) that are available within the CMS. Access may be performed by the server side workflow manager. As previously described, each of the plurality of AI action templates is configured to perform a corresponding action using artificial intelligence. In addition, a first AI action template can be selected (e.g., via the user interface) from the plurality of AI action templates. Further, a prompt of the AI action template may be presented via the user interface for configuration to generate a configured AI action that can be inserted into the first workflow. For example, the prompt may be presented through user interface 500C of FIG. 5C, previously described, wherein the prompt may be configured for use within the first workflow. That is, one or more variables may be configured for the prompt, in order to configure the first AI action for use in the first workflow step. The prompt and/or the variables in the prompt may be predefined, such as within an AI action template. Further, the configured AI action may be further compiled by an end user (e.g., editor) by defining values for the variables that were configured within the prompt.

A variable can be any parameter that can be utilized within the prompt to provide some control over how the prompt is executed. For content generation and/or transformation, a variable may be taken from a group consisting of: an entry; bulk entries; a field; an internal reference; an external reference; text; an image; multiple choice of a plurality of options; a locale; an exclusion; and media.

In addition, when configuring variables, a first variable included in the prompt may be selected. Further, a value may be currently defined for the variable when configuring the variable. For example, the value may be provided through user input. In another implementation, the variable may include a plurality of extensions that is selectable. One extension may be selected to define the value for the variable, such that a first extension may be selected during configuration to configure the variable.

In other implementations, the variable may be left open for later definition when compiling the AI action and/or the prompt of the AI action. For example, the configuration of a first variable includes configuring and/or providing a plurality of extensions that are predefined with the variable. Each of the extensions can be selected for later definition of the variable during compilation of the AI action, such as during implementation of the first workflow step.

Figure 7C:
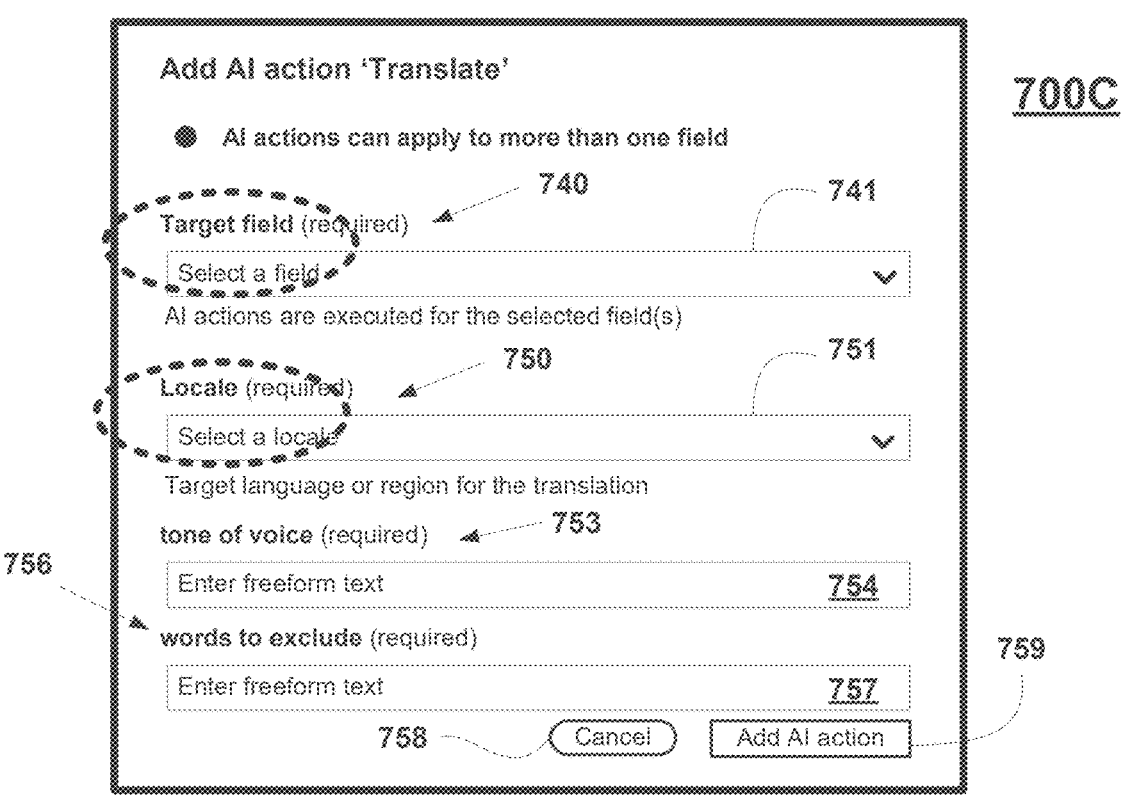
Figure 7D:
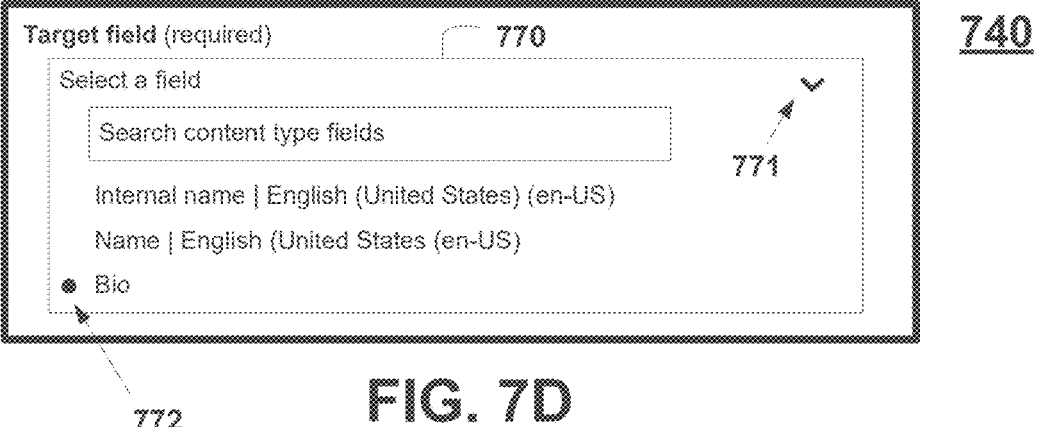
Figure 7E:
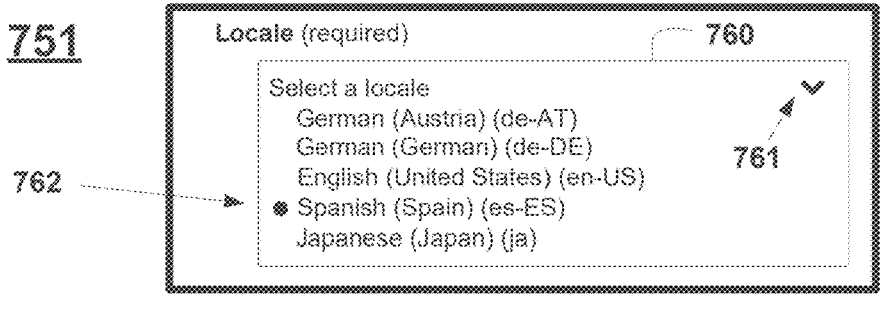

For example, FIG. 7C illustrates a user interface 700C used to configure a translation AI action for use within the first workflow step (e.g., translate step 712) of the first workflow. User interface 700C may be presented when a user (e.g., administrator) selects to include an AI action within 731 from user interface 700B of FIG. 7B. As shown, an AI action may be applied to one or more fields. One or more variables need to be configured within the AI action for use within the first workflow step.

For instance, a 'target field' variable 740 may be presented for definition. The fields may be presented as available extensions in block 741, or may be later defined through free form text in block 741. In particular, the target field variable 740 may be presented in an enlarged window 770 of FIG. 7D, which shows various options for presenting fields within the 'target field' variable 740. For example, a search box may be presented to a user (editor) to search for a field. Also, the drop down arrow 771 may be selected to present one or more drop down selected fields, such as an internal name, or name (official), bio, etc. As shown, the bio field 772 may be selected during configuration of the AI action, or the target field variable may be left open for later definition.

In addition, a 'locale' variable 750 may be presented for definition, wherein a locale defines one or more target languages or regions for the translation. One or more locales may be presented as available extensions, or may be later defined through free form text in block 751. In particular, the selection of 'locale' variable in block 751 may be presented in an enlarged window 760 of FIG. 7E, which shows various options. Drop down arrow 761 may be selected to present one or more extensions for the various locales, such as German (Austria), German (German), English (United States), Spanish (Spain), Japanese (Japan), etc. As shown, the Spanish locale may be selected during configuration of the AI action, or the locale may be left open for later definition.

In addition, FIG. 7C illustrates how a variable can be left open for definition by an end user (e.g., editor) during implementation of the workflow, or implementation of the AI action. In particular, the 'tone of voice' variable 753 may be used to control how the translation is to be performed, and may be configured to include one or more predefined selections, or to be left open for user input. For example, block 754 provides for later definition by user input (e.g., by an editor) through free form text. In addition, the 'words to exclude' variable 756 may be used to control which words can or need not be translated when performing the AI action to translate. The 'words to exclude' variable 756 may be configured to left open for user input. For example, block 757 provides for later definition by user input (e.g., by an editor) through free from text. For example, when an editor is implementing the first workflow to generate an author entry (e.g., for Aldous Huxley), the editor may wish to exclude the name "Aldous Huxley" from being translated, and would enter the name at the implementation phase, such as in block 757.

In another embodiment, during configuration of the prompt to configure the AI action, a new variable may be defined. The new variable is included in the prompt. Further during configuration, a plurality of extensions for defining a value for the new variable may be provided. Alternatively, an interface may be provided with the new variable that provides for user input for defining the value, such as during configuration of the AI action, or during implementation of the AI action and/or the first workflow step. This can be done by adding text to the prompt language, shown in FIG. 5C. For example, a newly defined variable can be used to make the translation professional.

In another embodiment, a new AI action may be defined. That is, a new definition and/or configuration of a prompt may be generated by the administrator. In particular, when modifying the first workflow step, the first AI action may be newly defined, and is configured by defining and/or generating a prompt, and configuring one or more variables in the prompt.

During configuration, an AI model (e.g., LLM) may be configured for use with the configured AI action implemented within the first workflow step. That is, the AI model is configured within the prompt. Also, notifications may be configured within the workflow step. Further, automation of the workflow may be configured within the workflow step.

Once configuration of the AI action is completed, the user (e.g., administrator may select the 'add AI action' button 759 of FIG. 7C to incorporate the translate AI action into the first workflow step of the first workflow. Conversely, during configuration, if the administrator does not wish to include the AI action in the workflow, the selection of the 'cancel' button removes the translate AI action from the first workflow step in the first workflow.

Figure 7F:
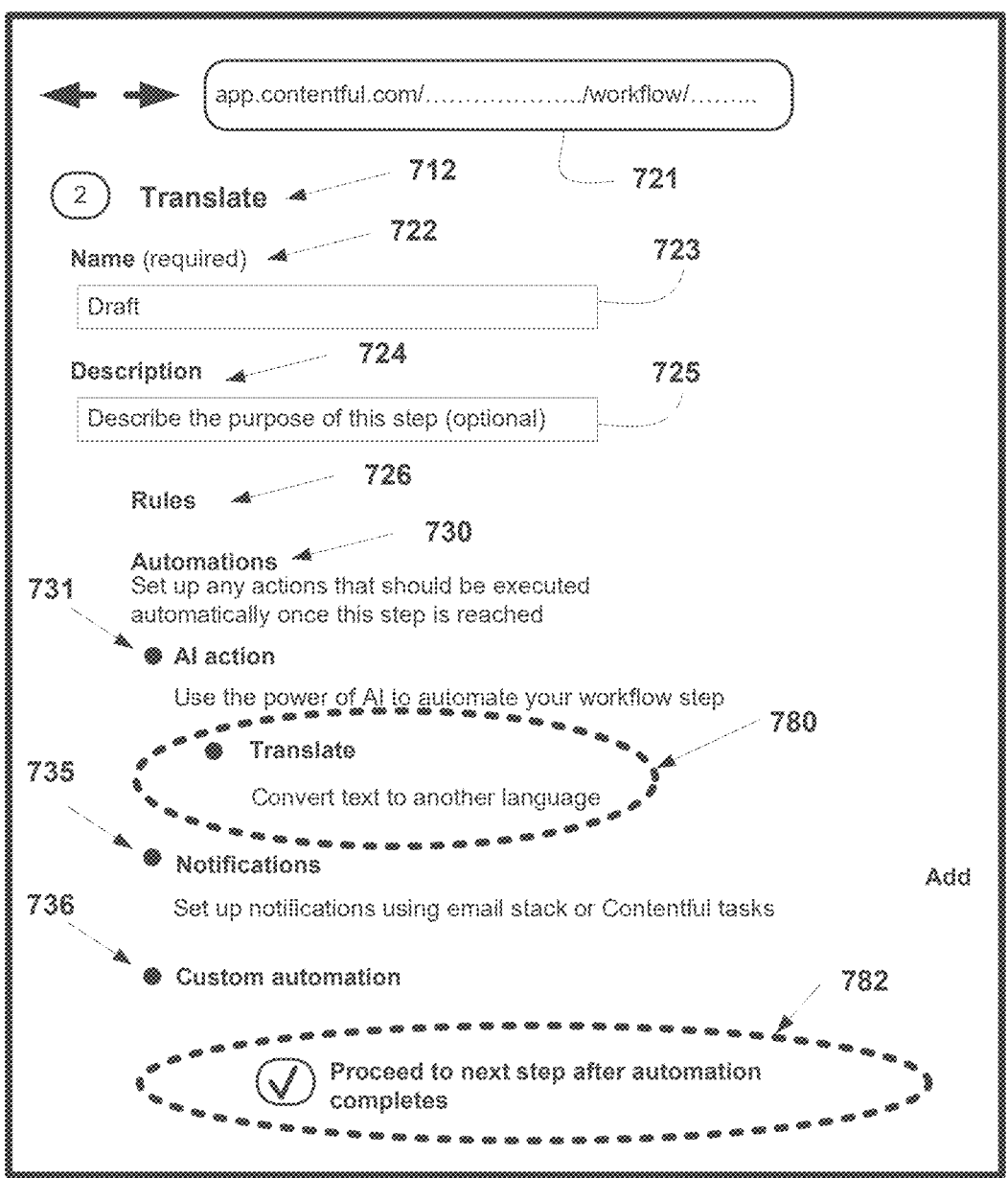

For example, FIG. 7F illustrates a user interface 700F that shows a configured first workflow step (e.g., translate step 712) within the first workflow (e.g., workflow #1). In particular, the first AI action that is configured (e.g., translated) is inserted within an order of performing the one or more actions within the first workflow step. Further, the AI action to translate is identified in highlight 780 as being performed within the translation workflow step 712 of the first workflow (e.g., workflow #1). That is, the AI action configured to translate is identified under the list of AI actions 731 used in the workflow step. Further, user interface 700F shows that a notification action can be configured within the translation workflow step 712. That is, a notification can be automatically performed, such as via email stack or an internal task, through selection during the configuration phase. As such, when configured, a notification is delivered to an entity after completion of the first workflow step during an implementation phase of the first workflow.

In addition, user interface 700F shows that implementation of the workflow by CMS may automatically proceed to the next workflow step after completion of the one or more actions in the first workflow step. That is, highlight 782 shows that the operation to automatically proceed to the next workflow step has been selected.

In another embodiment, the configured AI action can be tested during a test phase, before the AI action is published for use. In particular, the administrator may define each of the one or more values that are not defined to test the first AI action. Further, the variables are newly resolved with defined values. A prompt is constructed with the variables that are resolved. The prompt includes a configured AI model used for executing the prompt. The compiled prompt that is constructed is sent to the AI model (e.g., LLM) for execution. A result of the executed prompt is received, and can be analyzed to determine if the AI action is suitable for use. For example, FIG. 7G provides a user interface 700G including a 'playground' configured to test a configured AI action. As shown, the translation AI action is shown in user interface or window 500C, as previously introduced, and includes a prompt and one or more variables of the prompt that can be further defined to construct and compile the prompt, such as during testing and/or implementation. Window 990 shows a 'playground' within which the translation AI action may be tested. In particular, a context for the prompt in the translation AI action is defined by configuring the one or more variables with one or more values. The variables are resolved with defined values, and a prompt is constructed and/or compiled with resolved variables. The constructed prompt is delivered to the AI model (e.g., LLM) by selecting the 'run' button 995, and a result is returned for display in the playground. For example, an example case 991 may be used for testing the translation, as entered by the user (e.g., administrator) that is performing the test, including case 1, wherein the text "the quick brown fox jumps over the lazy dog" is presented for translation during the test. A second case 992, and additional cases 993, may be entered for testing. The result may be analyzed to determine if the configured AI action is suitable for publication.

With the detailed description of FIGS. 1-3, and flow diagram 600 of FIG. 6, flow diagram 800 of FIG. 8 illustrates a method for executing an AI action that is configured for execution in a workflow during an implementation phase of the AI action, in accordance with one embodiment of the present disclosure. In that manner, AI actions can be defined, controlled, and executed dynamically by leveraging prompt engineering, model selection, and variable-based customization in order to guide the use of AI on how to interact with content managed by the CMS. The operations performed in the flow diagram 800 may be implemented by one or more of the previously described components of CMS 100 and/or AI action platform 300 previously described in FIGS. 1-3.

In addition, 9A-9E illustrate multiple user interfaces showing the implementation and/or testing of an AI action, as provided through the operations of flow diagram 800, in accordance with embodiments of the present disclosure.

At 810, the method includes instantiating a workflow within a content management system (CMS) via a workflow editor that is executed on a client browser for accessing cloud data and functionality of the CMS. The CMS is a system that facilitates and manages the creation, storage, editing and delivery of digital content such as during implementation of a workflow, and is further able to utilize AI actions to automate actions and/or functions that are performed during the transformation and generation of AI driven content. The workflow editor is configured to implement the workflow, wherein the first workflow includes one or more workflow steps that are configured for generating and editing first data via the CMS. As previously described, the workflow may be a series of steps developed by an entity (e.g., organization, content creator, etc.) that are performed to accomplish a particular task, and the workflow may be repeatedly used to perform the task under different contexts.

At 820, the method includes reaching a first workflow step in the first workflow, as implemented using the CMS. In particular, the first workflow step includes one or more actions to be performed, wherein a first action performed in the first workflow step has been automated. For example, the first action has been automated using a corresponding AI action that has been configured for the workflow.

At 830, the method includes invoking a first artificial intelligence (AI) action in the first workflow step when performing the first action in the first workflow step. Invocation is performed automatically within the implementation of the workflow. In particular, the first AI action includes a prompt configured with one or more variables.

Figure 9A:
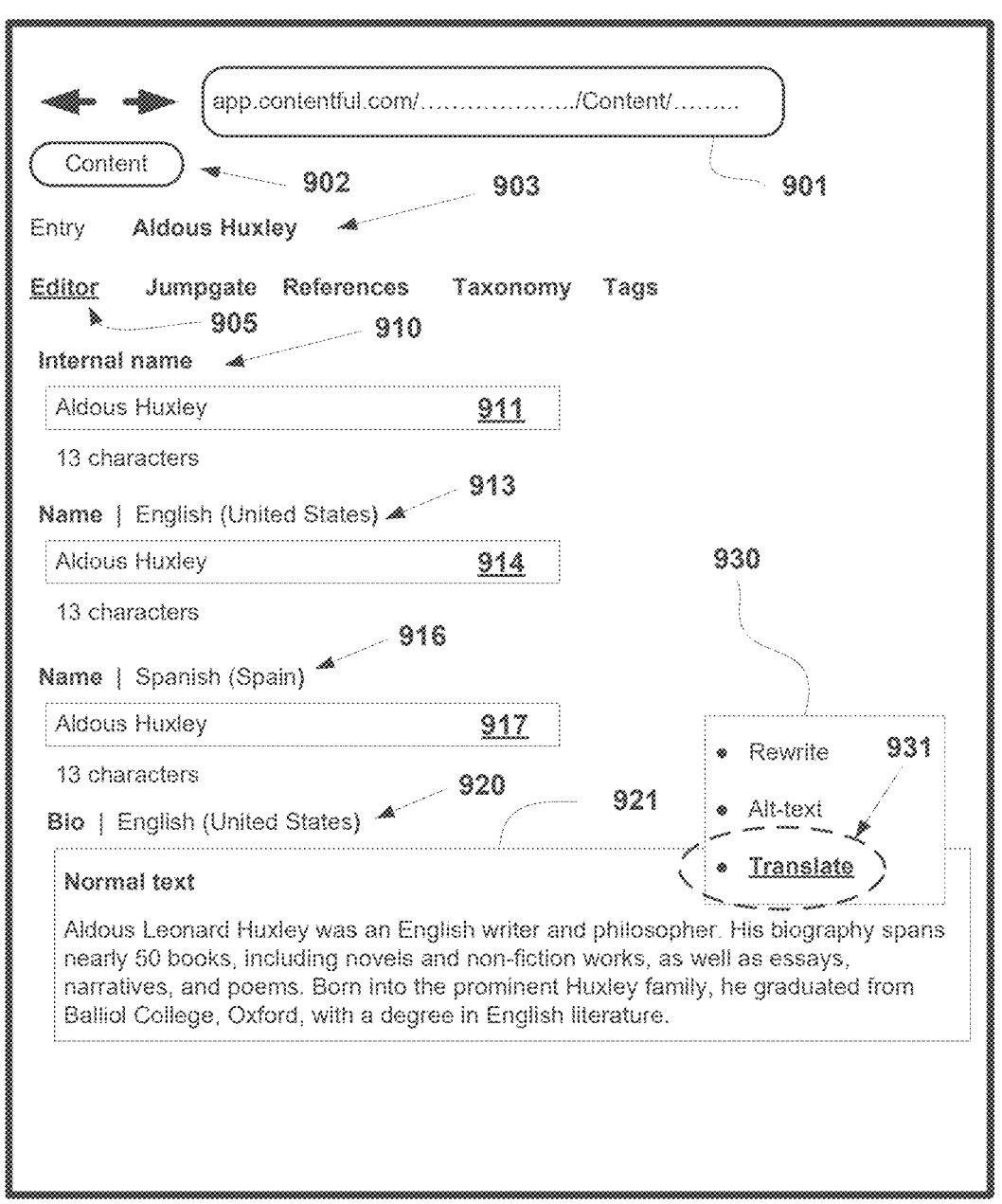
FIGS. 9A-9E illustrate multiple user interfaces showing the implementation and/or testing of an AI action for transforming or modifying testing or production (e.g., live) content, in accordance with embodiments of the present disclosure.

For example, FIG. 9A illustrates a user interface 900A that is accessed by a user (e.g., editor) during an implementation phase of the workflow, as is shown by the 'Editor' functionality 905. The user interface 900A provides access to the AI actions platform 300 for purposes of implementing a workflow, as shown by the address bar 901. Content 902 is being accessed during the implementation of the first workflow step. For example, the content 902 may include an author entry 903 for the author, Aldous Huxley. In particular, the entry 903 includes an 'internal name' 910 shown in block 911, and an official 'name' 913 that is presented in English (United States) shown in block 914. Further, the entry 903 includes an official 'name' 916 that is presented in Spanish (Spain) in block 917. Also, the entry 903 includes a 'Bio' 920 (content or field) that is presented in English (United States), wherein the text of the 'Bio' 920 is presented in block 921, in normal text.

Further, user interface 900A shows the invocation of the first AI action (e.g., to translate a selected field). In particular, the translate AI action is invoked for execution within the first workflow step, as shown by the highlighted AI action 931. The translate AI action may be preconfigured and/or defined to act on the 'Bio' 920 variable, and as such translation of the bio is automated using the translate AI action. Other AI actions may be presented that are suitable for acting on the "Bio' 920 content.

At 840, the method includes defining one or more values for the one or more variables. In that manner, a context for the prompt is defined for execution, by defining the one or more variables with the one or more values. During an implementation phase, the entire prompt of the translate AI action may not be exposed to user (e.g., editor) for efficiency. Instead, the variables that need to be defined within the prompt may be exposed to the editor. In that manner, variables of the prompt are defined with values to define a context for the prompt. As previously described, a variable can be any parameter that can be utilized within the prompt to provide some control over how the prompt is executed. For content generation and/or transformation, a variable may be taken from a group consisting of: an entry; bulk entries; a field; an internal reference; an external reference; text; an image; multiple choice of a plurality of options; a locale; an exclusion; and media.

A value of a selected variable is defined by the user (e.g., editor) implementing the workflow and/or AI action in the first workflow step. As previously described, the value may be defined through selection of a first extension from a plurality of extensions predefined for that variable. In addition, the value may be defined through user input.

Figure 9B:
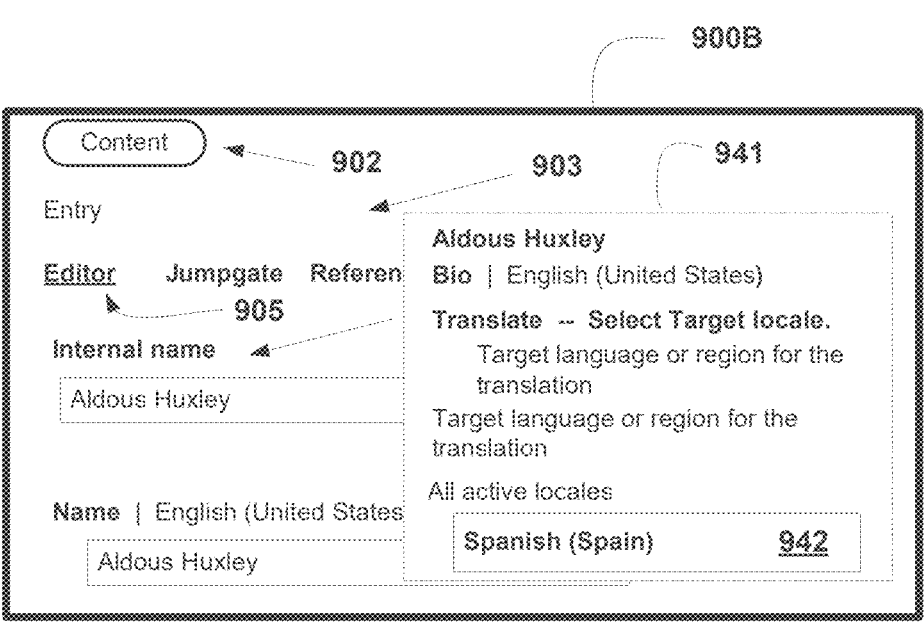

For example, FIG. 9B illustrates a user interface 900B that may include a window 941 that is presented over the entry shown in FIG. 9A, wherein the window 941 is used to further define values for one or more variables. Identifying information may be included within window 941, such as the content to be acted upon by the translate AI action, such as the 'Bio' content. In particular, the window 941 presents the 'locale' variable for definition under the translate AI action. For example, the user (e.g., editor) may be presented with a drop down list of all active locales, and may have selected the Spanish (Spain) locale, as is shown in selection box 942. In that manner, a value for the 'locale' variable is defined in order to compile the AI action.

Figure 9C:
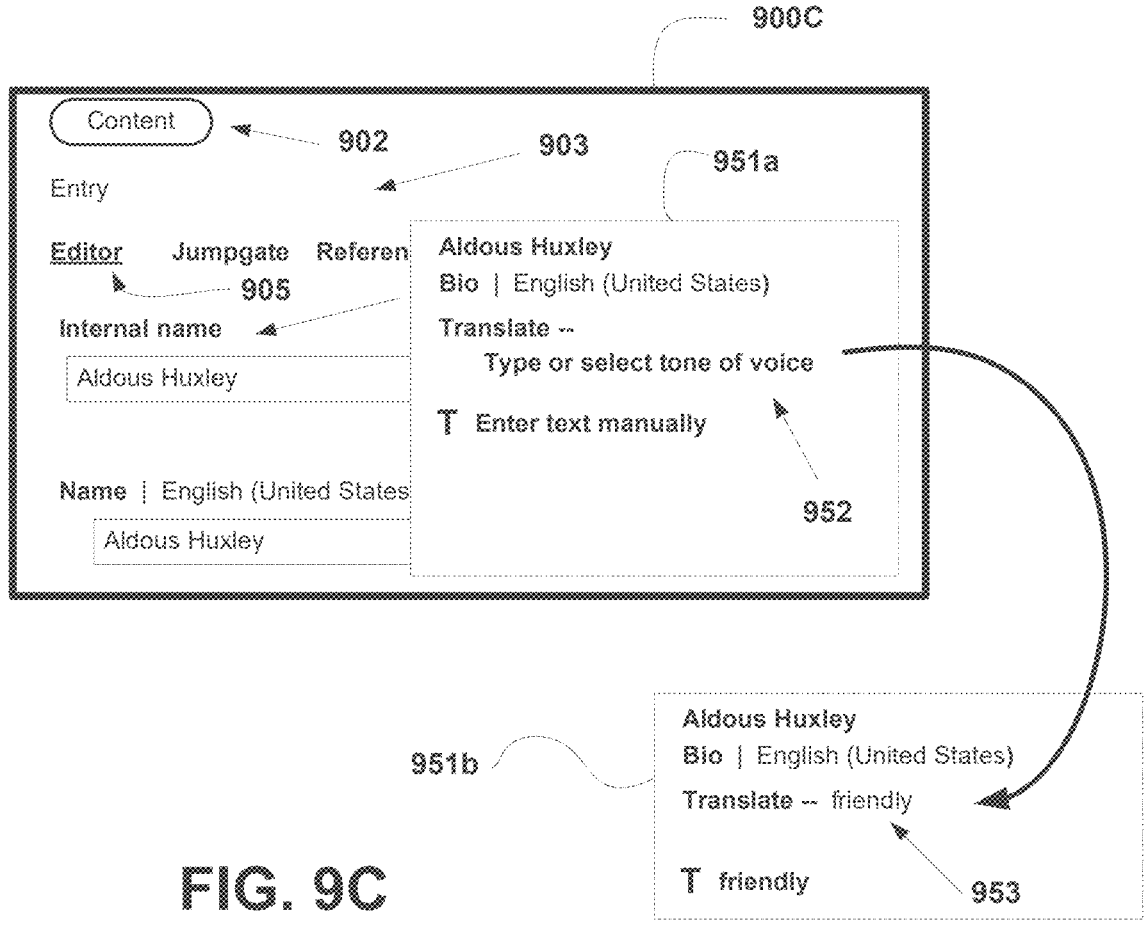

In addition, FIG. 9C illustrates a user interface 900C that may include a window 951a that is presented over the entry shown in FIG. 9A, wherein the window 951a is used to further define values for one or more variables. In particular, window 951a presents the 'tone of voice' variable for definition under the translate AI action. For example, the user (e.g., editor) may be requested to provide user input (e.g., in instruction 952) to define a value for the corresponding 'tone of voice' variable. The user may enter the value manually via text. In particular, window 951b shows that user has entered a value of 'friendly' 953 for the 'tone of voice' variable. In other cases, the 'tone of voice' variable may be presented with a list of extensions, such as 'friendly' or 'professional', etc.

Figure 9D:
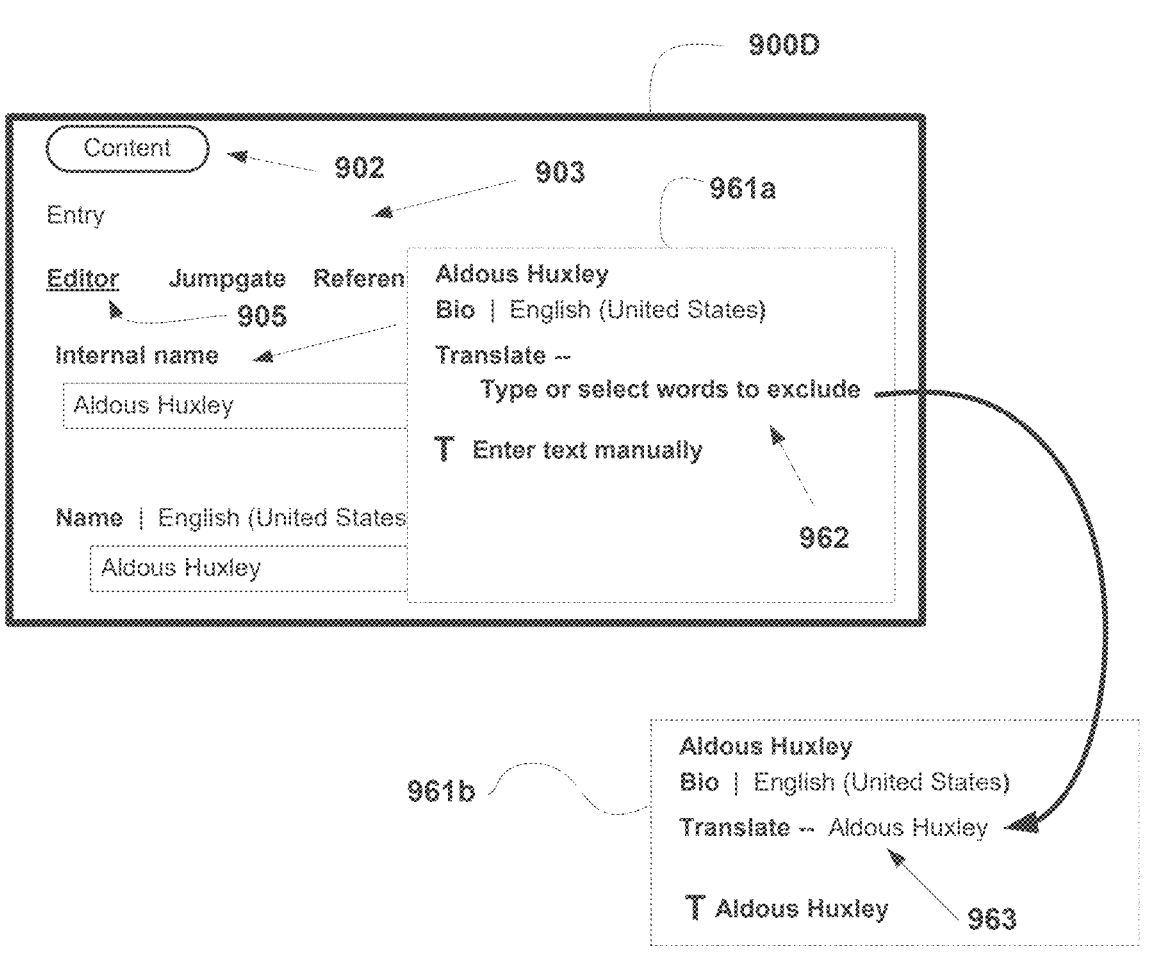

In another example for defining a variable, FIG. 9D illustrates a user interface 900D that may include a window 961a that is presented over the entry shown in FIG. 9A, wherein window 961a is used to further define values for one or more variables. In particular, window 961a presents the 'words to exclude' variable for definition under the translate AI action. For example, the user (e.g., editor) may be requested to provide user input (e.g., in instruction 962) to define a value for the corresponding 'words to exclude' variable. The user may enter the value manually via text. In particular, window 961b shows that user has entered a value of 'Aldous Huxley' 963 for the 'words to exclude' variable. For example, the content may be an author entry for the author, Aldous Huxley. The user may wish to exclude the author's name from being translated in the 'Bio' content or field.

At 850, the method includes sending the prompt with the one or more values that are defined for the one or more variables to an AI model (e.g., LLM) for executing the prompt. Before the prompt is delivered, the variables are resolved with the values that have been defined. For example, this may include ensuring that the defined variables are formatted for the configured AI model. In that manner, the prompt may be constructed and/or compiled for the configured AI model with the resolved variables. At that point the constructed prompt can be delivered to the configured AI model for execution.

At 860, the method includes receiving from the configured AI model a result of execution of the prompt, and at 870, the method includes incorporating the result into the first data. In one embodiment, proceeding to the next workflow step is automatically performed when implementing the workflow, after completion of the first workflow step.

Figure 9E:
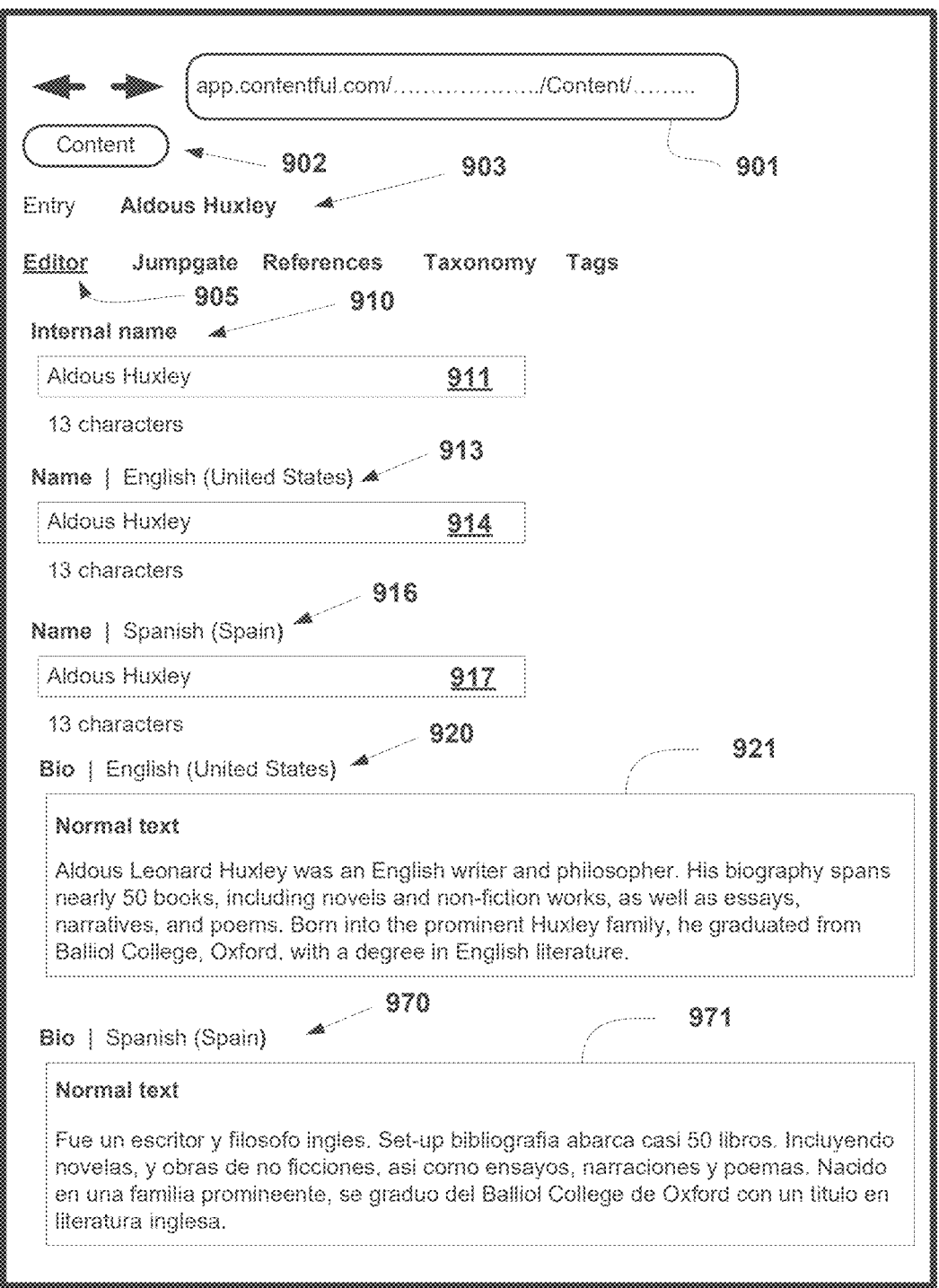

For illustration, FIG. 9E illustrates a user interface 900E that is accessed by a user (e.g., editor) that shows the result of the translation AI action being performed using artificial intelligence. The content 902 of the author entry 903 has been modified within the CMS to now include the translated bio, wherein the remaining content in the entry 903 may remain the same. In particular, the original 'Bio' 920 in English is presented in block 921, as previously described. In addition, the translated 'Bio' 970 in Spanish is presented in block 971 as normal text, for example. As such, both bio contents (e.g., in English and translated to Spanish) are included within the author entry 903, wherein either bio may be later accessed for a customer (i.e., not the administrator or the editor) of the book website.

In one embodiment, a method for implementing an AI action is disclosed. The method including instantiating a workflow within a content management system (CMS) via a workflow editor that is executed on a client browser for accessing cloud data and functionality of the CMS, wherein the workflow editor is configured to implement the workflow, wherein the first workflow includes one or more workflow steps that are configured for generating and editing first data via the CMS. The method including reaching a first workflow step in the first workflow, wherein the first workflow step includes one or more actions to be performed, wherein a first action performed in the first workflow step has been automated. The method including invoking a first artificial intelligence (AI) action in the first workflow step when performing the first action in the first workflow step, wherein the first AI action includes a prompt configured with one or more variables. The method including defining one or more values for the one or more variables. The method including sending the prompt with the one or more values that are defined for the one or more variables to a large language model (LLM) for executing the prompt. The method including receiving from the LLM a result of execution of the prompt. The method including incorporating the result into the first data.

In another embodiment, the method includes resolving the one or more variables with the one or more values that are defined; and constructing the prompt with the one or more variables that are resolved; and sending the prompt that is constructed to the LLM for execution.

In another embodiment, wherein in the method the defining the one or more values includes selecting a first variable that is included in the prompt, and defining a value for the first variable.

In another embodiment, wherein in the method the defining the value includes selecting a first extension as the value, wherein the first variable includes a plurality of extensions that is predefined.

In another embodiment, wherein the defining the value includes providing user input for the value.

In another embodiment, in the method a variable from the one or more variables is taken from a group consisting of: an entry; bulk entries; a field; an internal reference; an external reference; text; an image; multiple choice of a plurality of options; a locale; an exclusion; and media.

In another embodiment, the method includes defining a context for the prompt by defining the one or more variables with the one or more values.

In another embodiment, the method includes automatically proceeding to the next workflow step in the workflow after completion of the first workflow step.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Figure 10:
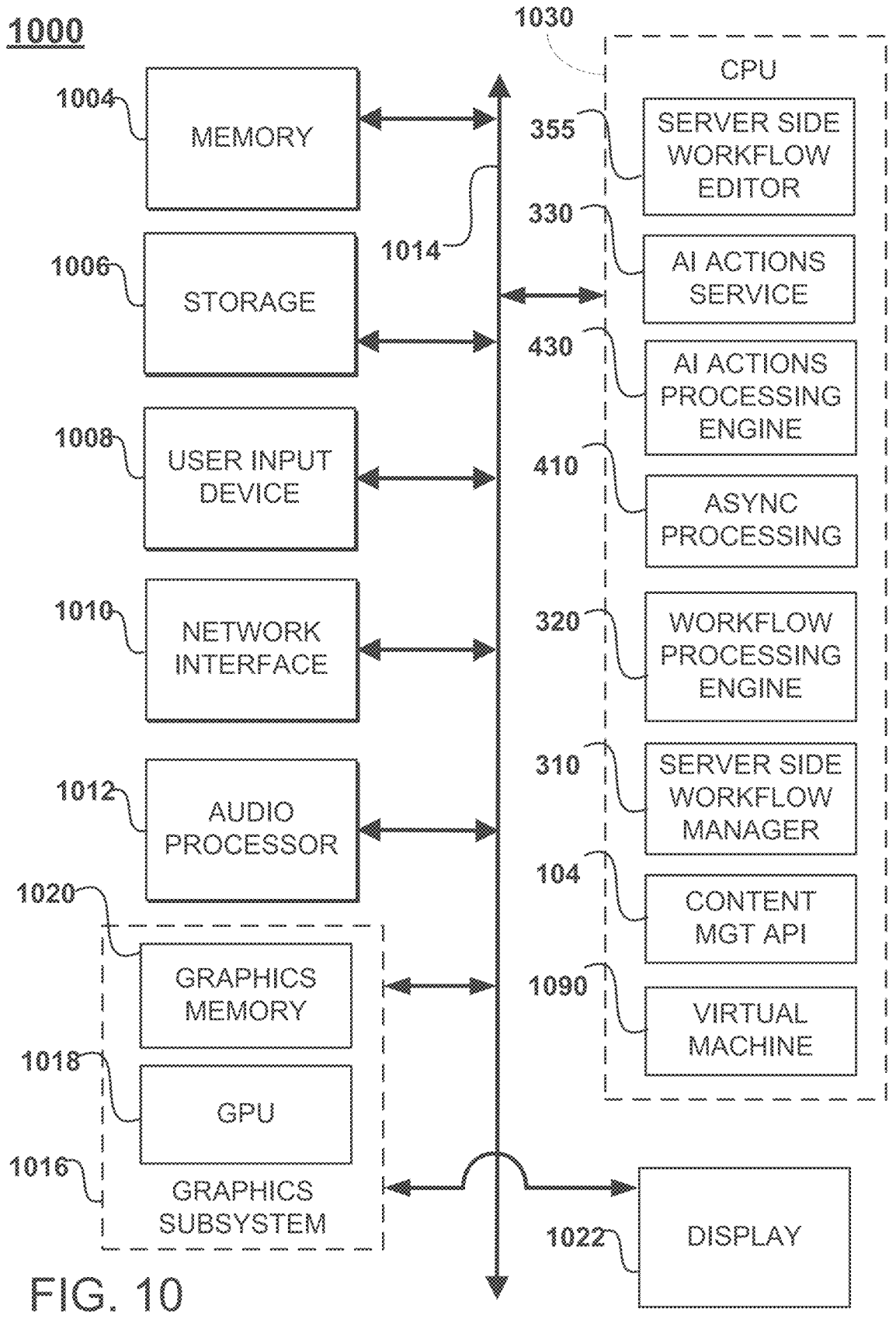
FIG. 10 illustrates components of an example device that can be used to perform aspects of the various embodiments of the present disclosure.

FIG. 10 illustrates components of an example device that can be used to perform aspects of the various embodiments of the present disclosure. For example, FIG. 10 illustrates an exemplary hardware system suitable for implementing a device in accordance with one embodiment. This block diagram illustrates a computer system 1000 suitable for practicing an embodiment of the invention, including services provided by a content management system (CMS) including AI actions. Computer system 1000 includes a central processing unit (CPU) 1002 for running software applications and optionally an operating system. CPU 1030 may be comprised of one or more general-purpose microprocessors with processing cores. One or more CPUs may be adapted for highly parallel and computationally intensive applications. For example, CPU 1030 may be configured to include server side workflow editor 355, an AI actions service 330, an AI actions processing engine 430, a component 410 performing asynchronous processing, a workflow processing engine 320, a server side workflow manager 310, and a content manager implementing a content management API and/or a content management API 104.

In some embodiments, components of the computer system 1000, configured to implement CMS services and/or AI actions, may be performed using physical machines (e.g., central processing units—CPUs—and graphics processing units—GPU), or virtual machines, or a combination of both, in various embodiments (e.g. in a cloud gaming environment or within a stand-alone system). For example, virtual machines (e.g. instances) may be created using a hypervisor of a host hardware utilizing one or more components of a hardware layer, such as multiple CPUs, memory modules, GPUs, network interfaces, communication components, etc. Generally, a hypervisor can present multiple guest operating systems of multiple instances that are configured with virtual resources. That is, each of the operating systems may be configured with a corresponding set of virtualized resources supported by one or more hardware resources (e.g. located at a corresponding data center). For instance, each operating system may be supported with a virtual CPU, multiple virtual GPUs, virtual memory, virtualized communication components, etc. As such, one or more of the components of the computer system 1000 may be virtualized and include a plurality of virtual machines running on a hypervisor of a host machine utilizing available hardware resources, wherein the virtual machines are configured to implement CMS services and/or AI actions, utilizing the hardware resources available to the hypervisor of the host. For example, a virtual machine may utilize distributed hardware resources.

Memory 1004 stores applications and data for use by the CPU 1030. Storage 1006 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1008 communicate user inputs from one or more users to the computer system 1000, examples of which may include keyboards, mice, joysticks, touch pads, touch screens, still or video cameras, and/or microphones. Network interface 1010 allows computer system 1000 to communicate with other computer systems via an electronic communications network, and may include wired or wireless communication over local area networks and wide area networks such as the Internet. An audio processor 1012 is adapted to generate analog or digital audio output from instructions and/or data provided by the CPU 1002, memory 1004, and/or storage 1006. The components of computer system 1000, including CPU 1030, memory 1004, data storage 1006, user input devices 1008, network interface 1010, and audio processor 1012 are connected via one or more data buses 1022.

A graphics subsystem 1014 is further connected with data bus 1022 and the components of the computer system 1000. The graphics subsystem 1014 includes a graphics processing unit (GPU) 1016 and graphics memory 1018. Graphics memory 1018 includes a display memory (e.g., a frame buffer) used for storing pixel data for each pixel of an output image. The graphics subsystem 1014 periodically outputs pixel data for an image from graphics memory 1018 to be displayed on display device 1022. Graphics memory 1018 can be integrated in the same device as GPU 1016, connected as a separate device with GPU 1016, and/or implemented within memory 1004. Pixel data can be provided to graphics memory 1018 directly from the CPU 1002, or the CPU 1002 provides data and/or instructions defining the desired output images, from which the GPU 1016 generates the pixel data of one or more output images. The data and/or instructions defining the desired output images can be stored in memory 1004 and/or graphics memory 1018.

Storage 1006 may be configured as network storage distributed across one or more data centers (e.g., data centers 1 through N). The data centers are located in different geographic locations. For example, multiple data centers may be distributed throughout the world, such as in North America, Europe and Japan. As such, data may be stored within one data center that is geographically located close to a client, or may be distributed across multiple data centers. In addition, storage of data may be synchronized across the data centers to provide for load balancing, replication, duplication, redundancy, etc. For example, data may be periodically replicated and backed up for data retention. Synchronization of data may also provide for ready access to data, wherein content that is located at multiple data centers may be accessed from the data center that is quickest to or able to respond.

In addition, a data center may be configured to provide distributed hardware resources for physical and/or virtual machines configured to provide CMS services, including AI actions. That is, hardware resources of a data center may be configured for performing artificial intelligence, wherein the hardware resources may include specialized processing engines and/or chips optimized to perform functions quickly and efficiently (e.g., specialized graphic processing units, such as those provided by Nvidia Corporation, etc.). In that manner, services provided by CMS, including AI actions, can be implemented using specialized hardware and software as provided by or implemented by resources of one or more data centers. Further, these services can be configured to access one or more AI models (e.g., LLMs).

Accordingly, embodiments of the present disclosure provide for combining custom prompts, AI models, and customized variables, to configure and/or compile AI actions to drive AI content transformation and generation. In that manner, specific instructions and/or prompts can be generated that guide the use of artificial intelligence on how to interact with content managed by the content management system.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein in embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:
1. A method, comprising:
   providing access to a content management system (CMS) via a workflow manager that is executed on a client browser for accessing cloud data and functionality of the CMS, wherein the workflow manager is configured to generate and modify a plurality of workflows configured to interact with the cloud data via the CMS;

accessing a first workflow via the workflow manager during a workflow configuration phase that defines the first workflow within the CMS, wherein the first workflow includes one or more workflow steps that are configured for generating and editing first data via the CMS;

accessing a first workflow step in the first workflow via the workflow manager, wherein the first workflow step includes one or more actions to be performed, wherein a first action performed in the first workflow step can be automated; and modifying the first workflow step in the first workflow via the workflow manager by configuring a first artificial intelligence (AI) action to be performed within the first workflow step by automating the first action, wherein the automating includes, providing a prompt that is dynamically tunable to allow customization of the first AI action, and identifying a large language model (LLM), based on dynamically tuned prompt, for executing the first AI action during the configuring of the first AI action, the dynamic tuning of the prompt and the identification of the LLM enabling real time AI-driven content transformation.

2. The method of claim 1, wherein the modifying the first workflow step (or the configuring the first AI action) includes:

accessing via a user interface a plurality of AI action templates available within the CMS via the workflow manager, wherein each of the plurality of AI action templates is configured to perform a corresponding action using artificial intelligence;

selecting a first AI action template from the plurality of AI action templates, the first AI action template selected to correspond with the first AI action;

presenting the prompt included in the first AI action template in the user interface; and configuring one or more variables of the prompt to configure the first AI action.

3. The method of claim 2, wherein the configuring the one or more variables includes:

selecting a first variable that is included in the prompt;

defining a value for the first variable.

4. The method of claim 2, wherein the configuring the one or more variables includes:

selecting a first variable that is included in the prompt; and configuring a plurality of extensions for the first variable, wherein each of the plurality of extensions is selectable for defining a value of the first variable during implementation of the first workflow step.

5. The method of claim 2, wherein the configuring the one or more variables includes:

selecting a first variable that is included in the prompt; and providing for user input for defining the value during implementation of the first workflow step.

6. The method of claim 2, wherein the configuring the one or more variables includes:

defining a new variable to be included in the prompt; and configuring a plurality of extensions for defining a value for the new variable or providing for user input for defining the value, wherein the value is defined during implementation of the first workflow step.

7. The method of claim 2, wherein a variable from the one or more variables is taken from a group consisting of:

an entry;

bulk entries;

a field;

an internal reference;

an external reference;

text;

an image;

multiple choice of a plurality of options;

a locale;

an exclusion; and media.

8. The method of claim 2, wherein the prompt of the first AI action template and at least one of the one or more variables are predefined.

9. The method of claim 2, further comprising:

configuring the large language model (LLM) within the prompt.

10. The method of claim 9, further comprising:

implementing the first workflow during an implementation phase;

reaching the first workflow step during the implementation phase;

resolving the one or more variables with one or more values that are defined;

constructing the prompt with the one or more variables that are resolved; and sending the prompt that is constructed to the LLM for execution.

11. The method of claim 1, further comprising:

configuring a notification action in the one or more actions to be performed, wherein a notification is delivered to an entity after completion of the first workflow step during an implementation phase of the first workflow.

12. The method of claim 1, further comprising:

configuring the first workflow step to automatically proceed to the next workflow step after completion of the one or more actions in the first workflow step during an implementation phase of the first workflow.

13. A computer system comprising:

a processor; and memory coupled to the processor and having stored therein instructions that, if executed by the computer system, cause the computer system to execute a method, comprising:

providing access to a content management system (CMS) via a workflow manager that is executed on a client browser for accessing cloud data and functionality of the CMS, wherein the workflow manager is configured to generate and modify a plurality of workflows configured to interact with the cloud data via the CMS;

accessing a first workflow via the workflow manager during a workflow configuration phase that defines the first workflow within the CMS, wherein the first workflow includes one or more workflow steps that are configured for generating and editing first data via the CMS;

accessing a first workflow step in the first workflow via the workflow manager, wherein the first workflow step includes one or more actions to be performed, wherein a first action performed in the first workflow step can be automated; and modifying the first workflow step in the first workflow via the workflow manager by configuring a first artificial intelligence (AI) action to be performed within the first workflow step by automating the first action, wherein the automating includes, providing a prompt that is dynamically tunable to allow customization of the first AI action, and identifying a large language model (LLM), based on dynamically tuned prompt, for executing the first AI action during the configuring of the first AI action, the dynamic tuning of the prompt and the identification of the LLM enabling real time AI-driven content transformation.

14. The computer system of claim 13, wherein in the method the modifying the first workflow step (or the configuring the first AI action) includes:

accessing via a user interface a plurality of AI action templates available within the CMS via the workflow manager, wherein each of the plurality of AI action templates is configured to perform a corresponding action using artificial intelligence;

selecting a first AI action template from the plurality of AI action templates, the first AI action template selected to correspond with the first AI action;

presenting the prompt included in the first AI action template in the user interface; and configuring one or more variables of the prompt to configure the first AI action.

15. The computer system of claim 14, wherein in the method the configuring the one or more variables includes:

selecting a first variable that is included in the prompt;

configuring a plurality of extensions for the first variable, wherein each of the plurality of extensions is selectable for defining a value of the first variable during implementation of the first workflow step; or providing for user input for defining the value during implementation of the first workflow step.

16. The computer system of claim 14, wherein the method a variable from the one or more variables is taken from a group consisting of:

an entry;

bulk entries;

a field;

an internal reference;

an external reference;

text;

an image;

multiple choice of a plurality of options;

a locale;

an exclusion; and media.

17. A content management system (CMS) that enables creation or editing of content that is accessible over the internet, comprising:

a server executing a server side workflow manager for generating and modifying a plurality of workflows configured to interact with cloud data, the server side workflow manager having program instructions, which when executed on the server, are configured to interface with a plurality of modules executing on one or more servers including the server and/or on one or more client browsers;

wherein the server side workflow manager interfaces with a web workflow manager executed on a first client browser to define a first workflow within the CMS, wherein the first workflow includes one or more workflow steps that are configured for generating and editing first data;

wherein the server provides the server side workflow manager with access to a plurality of artificial intelligence (AI) action templates stored on a storage server, wherein each of the plurality of AI action templates is configured to perform a corresponding action using artificial intelligence;

wherein the server side workflow manager interfaces with the web workflow manager to access a first workflow step in the first workflow, wherein the first workflow step includes one or more actions to be performed, wherein a first action performed in the first workflow step can be automated, wherein the server side workflow manager interfaces with the web workflow manager to modify the first workflow step in the first workflow by configuring a first artificial intelligence (AI) action to be performed within the first workflow step by automating the first action, wherein the automating includes, providing a prompt that is dynamically tunable to allow customization of the first AI action, and identifying a large language model (LLM), based on dynamically tuned prompt, for executing the first AI action during the configuring of the first AI action, the dynamic tuning of the prompt and the identification of the LLM enabling real time AI-driven content transformation.

18. The system of claim 17, further comprising:

wherein the server side workflow manager interfaces with the web workflow manager to access the plurality of AI action templates available within the CMS, and to select a first AI action template from the plurality of AI action templates, and to configure one or more variables of the prompt of the first AI action template to configure the first AI action, the first AI action template selected to correspond with the first AI action.

19. The system of claim 18, wherein a variable from the one or more variables is taken from a group consisting of:

an entry;

bulk entries;

a field;

an internal reference;

an external reference;

text;

an image;

multiple choice of a plurality of options;

a locale;

an exclusion; and media.

20. The system of claim 18, further comprising:

a server side workflow editor configured to instantiate the plurality of workflows, wherein the server side workflow editor interfaces with a web workflow editor executed on a second client browser to instantiate the first workflow during an implementation phase;

an AI actions service interfacing with the web workflow editor to invoke the first AI action in the first workflow step when performing the first action in the first workflow step, wherein the first AI action includes the prompt configured with one or more variables, wherein the AI actions service interfaces with the web workflow editor to define one or more values for the one or more variables, wherein the AI actions service resolves the one or more variables of the prompt with the one or more values that are defined; and an AI actions processing engine configured to construct the prompt with the one or more variables that are resolved and send the prompt that is constructed to the large language model (LLM) for execution, wherein the LLM is configured within the prompt, wherein the AI actions processing engine receives from the LLM a result of execution of the prompt, wherein the AI actions processing engine incorporates the result into the first data.

\* \* \* \* \*